(12) United States Patent
Faaborg et al.

(10) Patent No.: US 8,811,951 B1
(45) Date of Patent: Aug. 19, 2014

(54) MANAGING DISPLAY OF PRIVATE INFORMATION

(71) Applicant: Google Inc., Mountain View, CA (US)

(72) Inventors: Alexander Faaborg, Mountain View, CA (US); Joshua Robin Kaplan, Mountain View, CA (US); Michael Steven Feldstein, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/149,459

(22) Filed: Jan. 7, 2014

(51) Int. Cl.
*H04M 1/66* (2006.01)
*H04M 1/68* (2006.01)
*H04M 3/16* (2006.01)

(52) U.S. Cl.
USPC ........ 455/411; 455/410; 455/414.1; 455/418; 455/466; 345/158; 340/384.1; 340/539.22; 340/856.3

(58) Field of Classification Search
CPC ..... G06F 1/163; G06F 3/0346; G06F 1/1649; G06F 3/011; H04B 1/385; H04B 2001/3861; H04M 1/0233; H04W 52/0254; H04W 52/0251
USPC ........... 455/410–411, 414.1–414.4, 418, 466; 345/158
See application file for complete search history.

(56) References Cited

U.S. PATENT DOCUMENTS 5,493,692 A * 2/1996 Theimer et al. .............. 455/26.1
6,874,127 B2 3/2005 Newell et al.
8,515,505 B1 8/2013 Pattikonda
2006/0093998 A1 * 5/2006 Vertegaal ....................... 434/236
2008/0055194 A1 * 3/2008 Baudino et al. ................... 345/8
2013/0222270 A1 8/2013 Winkler et al.
2013/0222271 A1 8/2013 Alberth et al.

OTHER PUBLICATIONS

Shah, "Casio G-Shock with High Brightness LED automatically illuminates the display when the user tilts the watch toward the eyes to check the time", FarEastGizmos [online]. Aug. 23, 2010. Retrieved from the Internet: <http://fareastgizmos.com/other_stuff/casio_gshock_with_high_brightness_led_automatically_automatically_illuminates_the_display_when_the_user_tilts_the_watch_toward_the_eye.php> 3 pgs.

"The Meteor smart watch", kreyos 2014 [online]. Retrieved from the Internet: <http://www.kreyos.com/?utm_source=indiegogo&utm_medium=web&utm_campaign=igg> 8 pgs.

Shanklin, "Review: Pebbl smartwatch", gizmag [online]. Sep. 8, 2013. Retrieved from the Internet: <http://www.gizmag.com/pebble-watch-review/28990/> 11 pgs.

* cited by examiner

*Primary Examiner* — Quan M Hua
(74) *Attorney, Agent, or Firm* — Shumaker & Sieffert, P.A.

(57) ABSTRACT

In one example, a method includes receiving a first indication of an incoming communication and determining that the incoming communication includes private information. The method may also include outputting, for display at a wearable computing device, a second indication of the incoming communication, wherein the indication includes non-private information. The method may also include determining, based on motion data generated by the wearable computing device, that a user of the wearable computing device is likely viewing the wearable computing device. The method may also include outputting, for display at the wearable computing device, an indication of the private information.

30 Claims, 6 Drawing Sheets

MANAGING DISPLAY OF PRIVATE INFORMATION

BACKGROUND

Mobile computing devices allow a user to perform a variety of functions. For example, mobile computing devices may be capable of accessing the Internet, executing gaming applications, playing media, sending and receiving messages, as well as providing functionality of a traditional cellular telephone. In some examples, a user may wear such mobile computing devices (e.g., by attachment and/or coupling to the user's body and/or clothing). However, in some instances, an individual other than a user wearing a mobile computing device may be able to view information displayed by a wearable computing device (such as a "smart watch"), resulting in a potential privacy concern for the user of the wearable computing device.

SUMMARY

In one example, a method includes receiving a first indication of an incoming communication, determining that the incoming communication includes private information; outputting, for display at a wearable computing device, a second indication of the incoming communication, wherein the second indication includes non-private information, determining, based on motion data generated by the wearable computing device, that a user of the wearable computing device is likely viewing the wearable computing device, and outputting, for display at the wearable computing device, an indication of the private information.

In another example, a mobile computing device includes one or more processors, and at least one module executable by the one or more processors to: receive a first indication of an incoming communication, determine that the incoming communication includes private information, output, for display at a wearable computing device, a second indication of the incoming communication, wherein the second indication includes non-private information, receive, from the wearable computing device, motion data corresponding to a movement of the wearable computing device, determine, based on the motion data, that a user of the mobile computing device is likely viewing the wearable computing device, and output, for display at the wearable computing device, an indication of the private information.

In an additional example, a computer-readable storage medium stores instructions that, when executed by one or more processors of a computing device, cause the one or more processors to: receive a first indication of an incoming communication, determine that the incoming communication includes private information, output, for display at a wearable computing device, a second indication of the incoming communication, wherein the second indication includes non-private information, determine, based on motion data generated by the wearable computing device, that a user of the wearable computing device is likely viewing the wearable computing device, and output, for display at the wearable computing device, an indication of the private information.

In an additional example, a wearable computing device includes: one or more processors, one or more sensors, a display, and at least one module executable by the one or more processors to: receive a first indication of an incoming communication, determine that the incoming communication includes private information, output, for display at the display, a second indication of the incoming communication, wherein the second indication includes non-private information, generate, by at least one of the one or more sensors, motion data corresponding to a movement of the wearable computing device, determine, based on the motion data, that a user of the wearable computing device is likely viewing the wearable computing device, and output, for display at the display, an indication of the private information.

The details of one or more examples of the disclosure are set forth in the accompanying drawings and the description below. Other features, objects, and advantages will be apparent from the description and drawings, and from the claims.

DETAILED DESCRIPTION

Techniques according to the disclosure may enable a wearable computing device to selectively display public or private information based on whether a user of the wearable computing device is likely viewing a display of the wearable computing device. In some examples, a wearable computing device may display private information when the user of the wearable device is likely viewing the wearable computing device and refrain from displaying the private information when the user is likely not viewing the wearable computing device. In this way, individuals other than the user may be prevented from observing a user's private information displayed at a wearable computing device, without significantly impairing the user's ability to interact with the wearable computing device.

Figure 1:
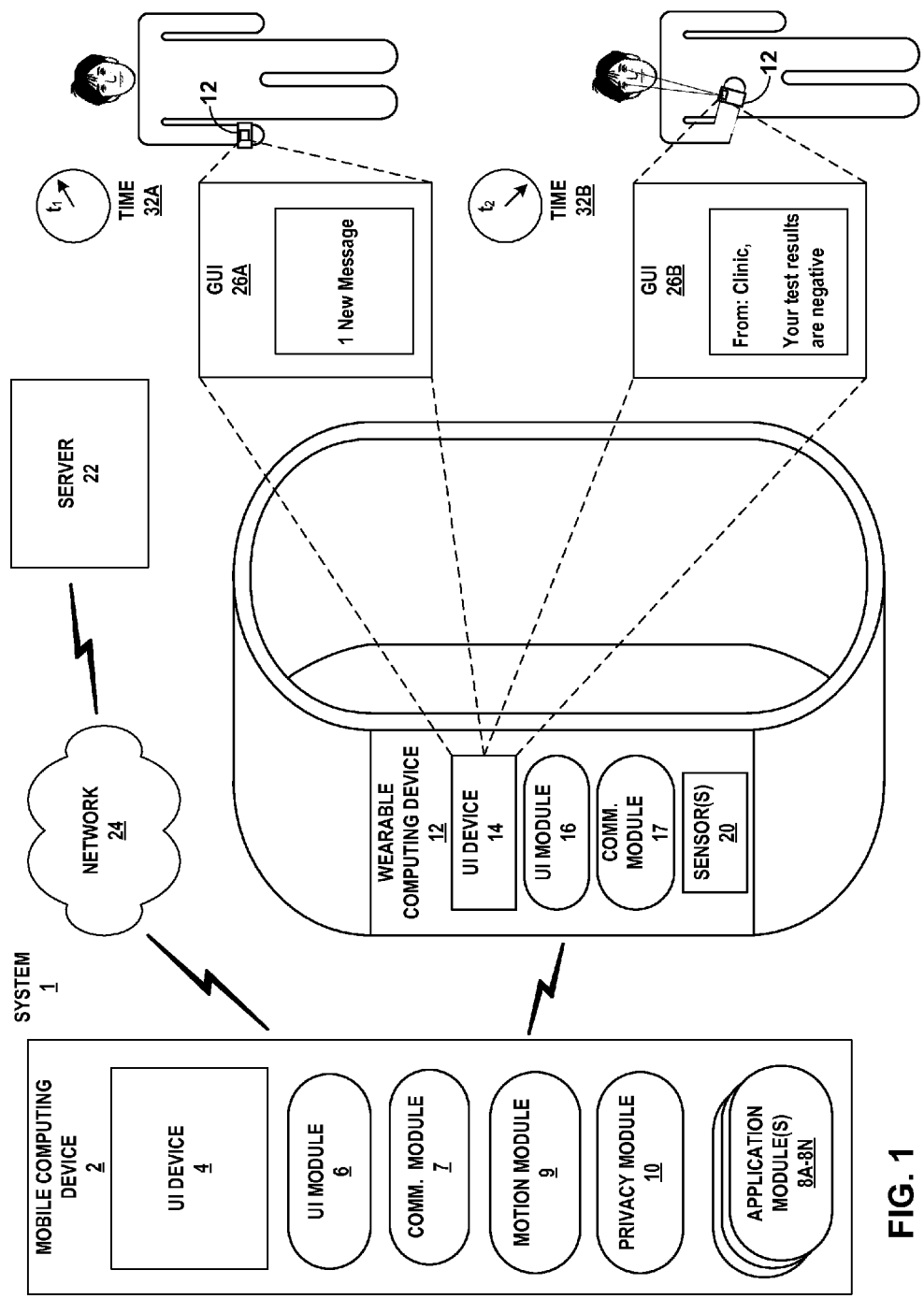
FIG. 1 is a block diagram illustrating an example system for managing the display of private information at a wearable device, in accordance with one or more techniques of the present disclosure.

FIG. 1 is a block diagram illustrating example system 1 for managing the display of private information at a wearable computing device, in accordance with one or more techniques of the present disclosure. As shown in the example of FIG. 1, system 1 includes mobile computing device 2, wearable computing device 12, server 22, and network 24. In some examples, mobile computing device 2 may be operatively and/or communicatively coupled to server 22 by network 24. Mobile computing device 2 may also be operatively and/or communicatively coupled to wearable computing device 12 using wireless communication, such as Bluetooth, Near-Field Communication, Wi-Fi, etc. In some instances, mobile computing device 2 may be in a bag or pocket of a user and wearable computing device 12 may be on the user's wrist.

In the example of FIG. 1, mobile computing device 2 includes user interface (UI) device 4, UI module 6, communication module 7, a plurality of application modules 8A-8N (collectively, "application modules 8"), motion module 9, and privacy module 10. Examples of mobile computing device 2 may include, but are not limited to, portable or mobile devices such as mobile phones (including smart phones), tablet computers, cameras, personal digital assistants (PDAs), etc. Other examples of mobile computing device 2 that implement techniques of this disclosure may include additional components not shown in FIG. 1.

In some examples, mobile computing device 2 may include UI device 4. A user associated with mobile computing device 2 may interact with mobile computing device 2 by providing various user inputs into the mobile computing device 2, e.g., using the at least one UI device 4. In some examples, UI device 4 is configured to receive tactile, audio, or visual input. In addition to receiving input from a user, UI device 4 can be configured to output content, such as a graphical user interface (GUI) for display. In some examples, UI device 4 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. In other examples, the display device can be physically separate from a presence-sensitive device included in mobile computing device 2.

As shown in FIG. 1, mobile computing device 2 may also include UI module 6. UI module 6 can perform one or more functions to receive an indication of input, such as user input, and send the indications of the input to other components associated with mobile computing device 2, such as one or more of application modules 8. UI module 6 may receive indications of user input from various sources, such as UI device 4, communication module 7, a network interface, or a user input device. Using the data, UI module 6 may cause other components associated with mobile computing device 2, such as UI device 4, to provide output based on the data.

Mobile computing device 2 can also include communication module 7. In some examples, communication module 7 may manage communications between mobile computing device 2 and an external server, such as server 22. For instance, communication module 7 may receive a message from server 22. In some examples, communication module 7 may also manage communication between mobile computing device 2 and one or more wearable computing devices, such as wearable computing device 12. For instance, communication module 7 may exchange information with wearable computing device 12 and server 22. As one example, communication module 7 may receive motion data from wearable computing device 12. As another example, communication module 7 may receive an incoming communication from server 22. In some examples, communication module 7 may provide the received information to other components of mobile computing device 2. For example, communication module 7 may provide the received motion data to one of application modules 8 for processing.

In some examples, mobile computing device 2 may include motion module 9. Motion module 9 may include functionality to analyze motion data. In some examples, motion module 9 may analyze motion data received from a wearable computing device to determine whether a user of the wearable computing device is likely viewing the wearable computing device. Motion module 9 may exchange data with other components of mobile computing device 2. For instance, motion module 9 may receive motion data from communication module 7 or send an indication that a user of the wearable computing device is likely viewing the wearable computing device to communication module 7.

In some examples, mobile computing device 2 may include privacy module 10. Privacy module 10 may include functionality to analyze an incoming communication to determine that the incoming communication includes private information. Private information, as used in this disclosure, includes any information that a user of a device would prefer not be shared with other persons. Public, or non-private, information, as used in this disclosure, includes any information other than private information. Privacy module 10 may receive data from other components of mobile computing device 2. For instance, privacy module 10 may receive motion data from communication module 7. Privacy module 10 may send data to other components of mobile computing device 2. For instance, privacy module 10 may send an indication that includes non-private information to communication module 7.

In situations in which the systems discussed herein, such as privacy module 10, may collect personal information about the user, or may make use of the user's personal information, the user may be provided with an opportunity to control whether, and to what extent, programs or features collect the user's information (e.g., information about the user's social network, social actions or activities, profession, the user's preferences, or the user's current location), or to control whether and/or how to receive content from the content server that may be more relevant to the user. In addition, certain data may be treated in one or more ways before it is stored or used, so that personally identifiable information is removed. For example, the user's identity may be treated so that no personally identifiable information can be determined for the user, or the user's geographic location may be generalized where location information is obtained (such as to a city, ZIP code, or state level), so that a particular location of the user cannot be determined. Thus, the user may have control over how information is collected about the user and used by a content server.

As shown in the example of FIG. 1, mobile computing device 2 may include one or more application modules 8. Application modules 8 may include functionality to perform various operations on computing device 2. In some examples, application modules 8 may receive input from communication module 7.

Any of UI module 6, communication module 7, motion module 9, privacy module 10, and application modules 8 (collectively the "mobile computing device modules") may be implemented in various ways. For example, one or more the mobile computing device modules can be implemented as a downloadable or pre-installed application or "app." In another example, one or more of the mobile computing device modules can be implemented as part of a hardware unit of mobile computing device 2. In another example, one or more of the mobile computing device modules can be implemented as part of an operating system of mobile computing device 2.

In the example of FIG. 1, wearable computing device 12 includes at UI device 14, UI module 16, communication module 17, and one or more sensors 20. In some examples, wearable computing device 12 may include mobile computing device 2. For instance, in some examples, mobile computing device 2 and wearable computing device 12 may comprise a single wearable computing device. Examples of wearable computing device 12 may include, but are not limited to, smart watches, smart glasses, headsets, mobile phones (including smartphones), tablet computers, cameras, personal digital assistants (PDAs), etc.

Wearable computing device 12 may include at least one UI device 14. A user associated with wearable computing device 12 may interact with wearable computing device 12 by providing various user inputs into the wearable computing device 12, e.g., using the at least one UI device 14. In some examples, the at least one UI device 14 is configured to receive tactile, audio, or visual input. In addition to receiving input from a user, UI device 14 can be configured to output content such as a graphical user interface (GUI) for display. In some examples, UI device 14 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. In other examples, the display device can be physically separate from a presence-sensitive device included in wearable computing device 12.

Wearable computing device 12 may also include one or more sensors 20. One or more of sensors 20 may be configured to measure the movement of wearable computing device 2. For instance, one or more of sensors 20 may be configured to measure the position, rotation, velocity, and/or acceleration of wearable computing device 12. A user associated with wearable computing device 12 may interact with wearable computing device 12 by moving wearable device 12. Examples of one of more of sensors 20 may include, but are not limited to, accelerometers, gyroscopes, compass, proximity sensors, and cameras configured for facial recognition and/or eye tracking. While illustrated in FIG. 1 as positioned in the body of wearable computing device 12, in other examples, one or more of sensors 20 may be positioned in or around the band of wearable computing device 12.

In some examples, wearable computing device 12 may also include UI module 16. UI module 16 can perform one or more functions to receive an indication of input, such as user input, and send the indications of the input to other components associated with wearable computing device 12, such as communication module 17. For example UI module 16 can receive an indication that wearable computing device 12 is moving from sensors 20 and send the indications to communication module 17. UI module 16 can also receive information from components associated with wearable computing device 12, such as communication module 17. Using the information, UI module 16 may cause other components associated with wearable computing device 12, such as UI device 14, to provide output based on the information. For example, UI module 16 may receive information from communication module 17 and cause UI device 14 to output a GUI including the information.

As illustrated in FIG. 1, wearable computing device 12 may also include communication module 17. In some examples, communication module 17 may manage communications between wearable computing device 12 and a mobile computing device, such as mobile computing device 2. For instance, communication module 17 may exchange information with mobile computing device 2. As one example, communication module 17 may send motion data to mobile computing device 2. As another example, communication module 7 may receive an indication of an incoming communication from mobile computing device 2. In some examples, communication module 7 may exchange information with other components of wearable computing device 12.

For example, communication module 17 may provide the received indication of the incoming communication to UI module 16.

Either of UI module 16 and communication module 17 (collectively the "wearable computing device modules") may be implemented in various ways. For example, one or more of the wearable computing device modules can be implemented as a downloadable or pre-installed application or "app." In another example, one or more of the wearable computing device modules can be implemented as part of a hardware unit of wearable computing device 12. In another example, one or more of the wearable computing device modules can be implemented as part of an operating system of wearable computing device 12.

Rather than displaying all notifications on wearable computing device 12, techniques of this disclosure enable mobile computing device 2 and wearable computing device 12 to selectively display notifications based on whether the notification includes private information. For example, communication module 7 may receive an indication of an incoming communication. In some examples, communication module 7 may receive the indication from server 22. In other examples, communication module 7 may receive the indication from another component of mobile computing device 2, such as one of application modules 8. In either example, communication module 7 may provide the indication of the incoming communication to privacy module 10

Privacy module 10 may receive the indication of the incoming communication and determine that the incoming communication includes private information. Privacy module 10 may determine that the incoming communication includes private information based on a sender of the incoming communication (e.g., a doctor, a lawyer, an accountant, a spouse, a close friend, etc.), content of the incoming communication (e.g., text of the incoming communication, audio of the incoming communication, content of images included in the incoming communication, etc.), a privacy flag associated with the incoming communication (e.g., the sender manually indicated that the incoming communication as private), one or more predefined privacy settings (e.g., time of day, geographical location of wearable computing device 2, list of non-private senders, and/or list of private senders) etc. In some examples, privacy module 10 may determine that the incoming communication includes private information based on any combination of factors.

For example, privacy module 10 may determine that an incoming communication that indicates a level of a battery of mobile computing device 2 does not include private information. As another example, privacy module 10 may determine that an incoming communication includes private information where wearable computing device 2 is at a predefined location, such as the user's workplace.

As shown in FIG. 1, the incoming communication was sent from "Clinic" and includes the text "Your test results are negative." Privacy module 10 may determine that the incoming communication includes private information based on the sender ("Clinic") and the phrase "test results" included in the text of the incoming communication. Communication module 7 may, rather than output private information included in the incoming communication, output an indication of the incoming communication that includes non-private information. For instance, communication module 7 may output, for display at wearable computing device 12, a graphical indication of the incoming communication to wearable device 12 that includes non-private information. In some examples, the non-private information may include the identity of the sender of the incoming communication (e.g., the sender's name, phone number, screen name, avatar, etc. . . . ).

UI module 16 may receive the indication and may cause UI device 14 to display graphical user interface (GUI) 26A that includes the indication at time 32A. In the example of FIG. 1, GUI 26A includes non-private information "1 New Message." In other examples, GUI 26A may include any combination of images and text. In some examples, GUI 26A may include visual emphasis such as blinking, bolding, underlining, italicizing, highlighting, coloring, and/or scrolling. In any case, by outputting GUI 26A, wearable computing device 12 may indicate that wearable computing device 12 received an incoming communication, which includes private information, without displaying the private information.

The user associated with wearable computing device 12 and mobile computing device 2 may attempt to view wearable computing device 12. In some examples, the user may attempt to view wearable computing device 12 by moving the arm on which wearable computing device 12 is being worn. For instance, the user may engage in a motion similar to the motion a person performs to look at a watch. The motion may include an internal rotation of the user's wrist and a flexion of the user's shoulder and elbow. One or more sensors 20 of wearable computing device 12 may detect the user's movements and may provide motion data corresponding to the detected movement to communication module 17, which, in turn, sends the motion data to mobile computing device 2.

Communication module 7 of mobile computing device 2 may receive the motion data and provide the received motion data to motion module 9. Motion module 9 may determine, based on the motion data, that the user is likely viewing wearable computing device 12. For instance, motion module 9 may analyze the motion data and determine that the user internally rotated his/her wrist (e.g., the motion data indicates that wearable computing device 12 has rotated). Additionally, motion module 9 may analyze the motion data and determine that the user has flexed his/her shoulder and/or his/her elbow (e.g., the motion data indicates that wearable computing device 12 has moved vertically and/or laterally). As illustrated in FIG. 1, the user has internally rotated his/her wrist and flexed his/her elbow. After determining that the user is likely viewing wearable computing device 12, motion module 9 may send data to communication module 7 indicating that the user is likely viewing wearable computing device 12.

Communication module 7 may receive the indication and send, to wearable computing device 12 and for display, an indication of the private information included in the incoming communication. In some examples, the private information includes at least a portion of the content of the incoming communication. Communication module 17 of wearable computing device 12 may receive the indication from communication module 7 of mobile computing device 2 and provide the indication to UI module 16. UI module 16 may receive the indication and may cause UI device 14 to display GUI 26B at time 32B. In the example of FIG. 1, GUI 26B includes private information "From: Clinic, Your test results are negative." In other examples, GUI 26B may include any combination of images and text. In any case, by outputting GUI 26B when the user is viewing wearable computing device 12, system 1 may reduce the likelihood that other persons may observe the user's private information displayed at wearable computing device 12 without significantly impairing the user's ability to interact with wearable computing device 12.

Figure 2:
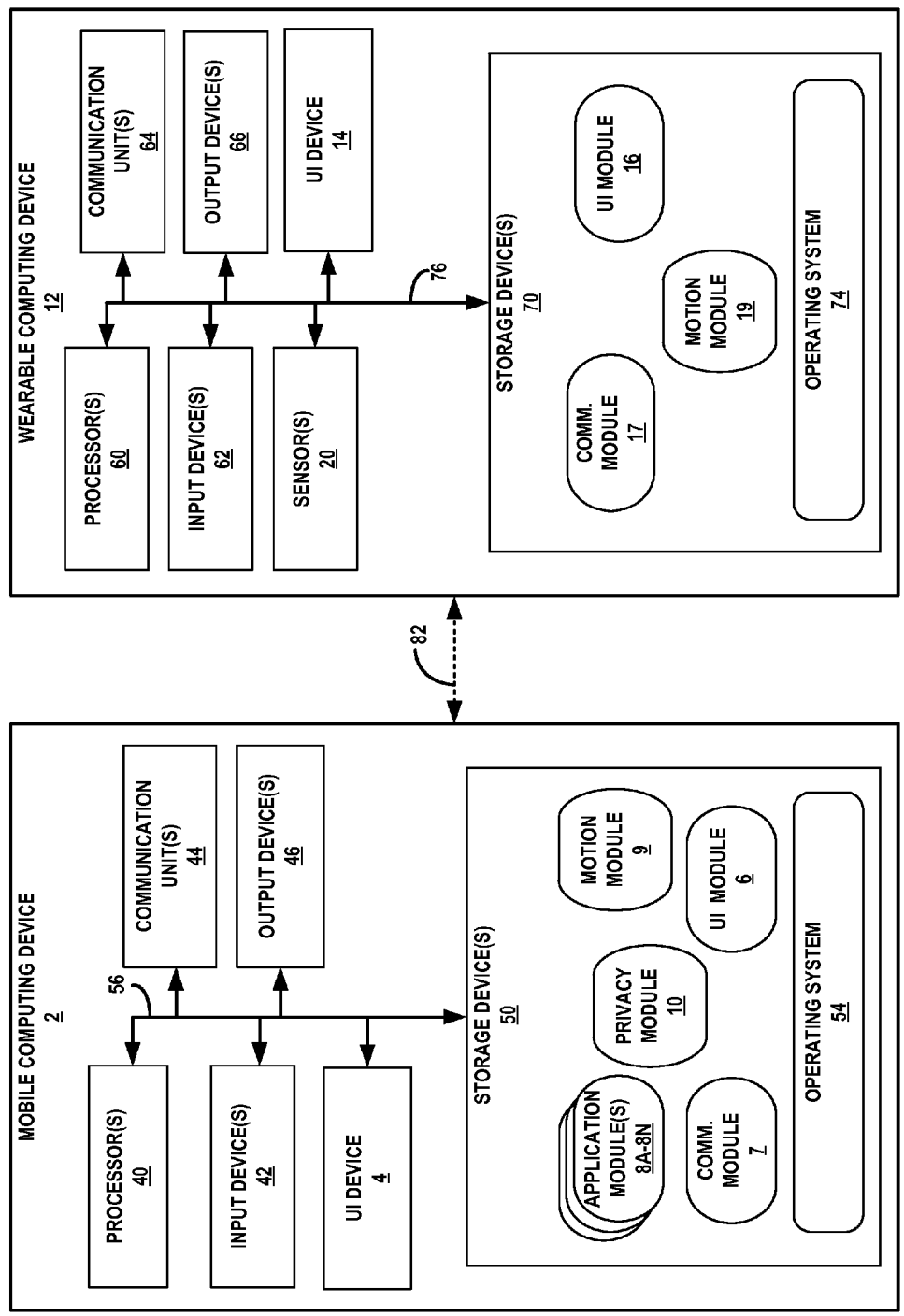
FIG. 2 is a block diagram illustrating a mobile computing device and a wearable device, in accordance with one or more techniques of the present disclosure.

FIG. 2 is a block diagram illustrating a mobile computing device and a wearable computing device, in accordance with one or more techniques of the present disclosure. FIG. 2 illustrates only one particular example of mobile computing device 2 and wearable device 12, and many other examples of mobile computing device 2 and wearable computing device 12 may be used in other instances.

As shown in the example of FIG. 2, mobile computing device 2 includes UI device 4, one or more processors 40, one or more input devices 42, one or more communication units 44, one or more output devices 46, and one or more storage devices 50. In the example of FIG. 2, mobile computing device 2 further includes UI module 6, communication module 7, one or more application modules 8A-8N (collectively "application modules 8"), motion module 9, privacy module 10, and operating system 54, which are executable by one or more processors 40. Each of components 4, 40, 42, 44, 46, 48, and 50 may be coupled (physically, communicatively, and/or operatively) using communications channels 56 for inter-component communications. In some examples, communication channels 56 may include a system bus, a network connection, an inter-process communication data structure, or any other method for communicating data. UI module 6, communication module 7, application modules 8, motion module 9, privacy module 10, and operating system 54 may also communicate information with one another, as well as with other components in mobile computing device 2.

One or more processors 40, in one example, are configured to implement functionality and/or process instructions for execution within mobile computing device 2. For example, processors 40 may be capable of processing instructions stored by storage device 50. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 50 may be configured to store information within mobile computing device 2 during operation. Storage devices 50, in some examples, include a computer-readable storage medium or computer-readable storage device. In some examples, storage devices 50 include a temporary memory, meaning that a primary purpose of storage device 50 is not long-term storage. Storage devices 50, in some examples, include a volatile memory, meaning that storage device 50 does not maintain stored contents when power is not provided to storage device 50. Examples of volatile memories include random access memories (RAM), dynamic random access memories (DRAM), static random access memories (SRAM), and other forms of volatile memories known in the art. In some examples, storage devices 50 are used to store program instructions for execution by processors 40. Storage devices 50, in some examples, are used by software or applications running on mobile computing device 2 (e.g., privacy module 10) to temporarily store information during program execution.

In some examples, storage devices 50 may further include one or more storage device 50 configured for longer-term storage of information. In some examples, storage devices 50 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 2, in some examples, also includes one or more communication units 44. Mobile computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, and Wi-Fi radios computing devices as well as Universal Serial Bus (USB). In some examples, mobile computing device 2 utilizes communication unit 44 to wirelessly communicate with an external device such as a server or a wearable computing device. For instance, mobile computing device 2 may utilize communication unit 44 to wirelessly communicate with wearable computing device 12 over link 82. In some examples, communication unit 44 may receive input from other components of mobile computing device 2, such as communication module 7, that causes communication unit 44 to wirelessly communicate with an external device, such as communication unit 64 of wearable computing device 12.

Mobile computing device 2, in one example, also includes one or more input devices 42. Input device 42, in some examples, is configured to receive input from a user through tactile, audio, or video sources. Examples of input device 42 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 46 may also be included in mobile computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), organic light emitting diode (OLED), or any other type of device that can generate intelligible output to a user. In some examples, UI device 4 may include functionality of one or more of input devices 42 and/or output devices 46.

Mobile computing device 2 also can include UI device 4. In some examples, UI device 4 is configured to receive tactile, audio, or visual input. In addition to receiving input from a user, UI device 4 can be configured to output content such as a GUI for display at a display device, such as a presence-sensitive display. In some examples, UI device 4 can include a presence-sensitive display that displays a GUI and receives input from a user using capacitive, inductive, and/or optical detection at or near the presence sensitive display. In some examples, UI device 4 is both one of input devices 44 and one of output devices 46.

In some examples, UI device 4 of mobile computing device 2 may include functionality of input devices 42 and/or output devices 46. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y,z) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 46.

Mobile computing device 2 may include operating system 54. Operating system 54, in some examples, controls the operation of components of mobile computing device 2. For example, operating system 54, in one example, facilitates the communication of UI module 6, communication module 7, motion module 9, and privacy module 10 with processors 40, communication units 44, storage devices 50, input devices 42, and output devices 46. UI module 6, communication module 7, motion module 9, and privacy module 10 can each include program instructions and/or data that are executable by mobile computing device 2 (e.g., by one or more processors 40). As one example, UI module 6 can include instructions that cause mobile computing device 2 to perform one or more of the operations and actions described in the present disclosure.

Mobile computing device 2 can include additional components that, for clarity, are not shown in FIG. 2. For example, mobile computing device 2 can include a battery to provide power to the components of mobile computing device 2. Similarly, the components of mobile computing device 2 shown in FIG. 2 may not be necessary in every example of mobile computing device 2. For example, in some configurations, mobile computing device 2 may not include output devices 46.

As shown in the example of FIG. 2, wearable computing device 12 includes UI device 14, one or more sensors 20, one or more processors 60, one or more input devices 62, one or more communication units 64, one or more output devices 66, and one or more storage devices 70. In the example of FIG. 2, wearable computing device 12 further includes UI module 16, communication module 17, motion module 19, and operating system 74, which are executable by one or more processors 60. Each of components 14, 20, 60, 62, 64, 66, 68, and 70 may be coupled (physically, communicatively, and/or operatively) using communications channels 76 for inter-component communications. In some examples, communication channels 76 may include a system bus, a network connection, an inter-process communication data structure, or any other method for communicating data. UI module 16, communication module 17, motion module 19, and operating system 74 may also communicate information with one another, as well as with other components in wearable computing device 12.

One or more processors 60, in one example, are configured to implement functionality and/or process instructions for execution within wearable computing device 12. For example, processors 60 may be capable of processing instructions stored by storage device 70. Examples of one or more processors 60 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 70 may be configured to store information within wearable computing device 12 during operation. Storage devices 70, in some examples, include a computer-readable storage medium or computer-readable storage device. In some examples, storage devices 70 include a temporary memory, meaning that a primary purpose of storage device 70 is not long-term storage. Storage devices 70, in some examples, include a volatile memory, meaning that storage device 70 does not maintain stored contents when power is not provided to storage device 70. Examples of volatile memories include random access memories (RAM), dynamic random access memories (DRAM), static random access memories (SRAM), and other forms of volatile memories known in the art. In some examples, storage devices 70 are used to store program instructions for execution by processors 60. Storage devices 70, in some examples, are used by software or applications running on wearable computing device 12 (e.g., communication module 17) to temporarily store information during program execution.

In some examples, storage devices 70 may further include one or more storage device 70 configured for longer-term storage of information. In some examples, storage devices 70 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Wearable computing device 12, in some examples, also includes one or more communication units 64. Wearable computing device 12, in one example, utilizes communication unit 64 to communicate with external devices via one or more networks, such as one or more wireless networks. Communication unit 64 may be a network interface card, such as an Ethernet card, an optical transceiver, a radio frequency transceiver, or any other type of device that can send and receive information. Other examples of such network interfaces may include Bluetooth, 3G, and Wi-Fi radios computing devices as well as Universal Serial Bus (USB). In some examples, wearable computing device 12 utilizes communication unit 64 to wirelessly communicate with an external device such as a mobile computing device or a server. For instance, wearable computing device 12 may utilize communication unit 64 to wirelessly communicate with mobile computing device 2 over link 82. In some examples, communication unit 64 may receive input from other components of wearable computing device 12, such as communication module 17, that causes communication unit 64 to wirelessly communicate with an external device, such as communication unit 44 of mobile computing device 2.

Wearable computing device 12, in one example, also includes one or more input devices 62. Input device 62, in some examples, is configured to receive input from a user through tactile, audio, or video sources. Examples of input device 62 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 66 may also be included in wearable computing device 12. Output device 66, in some examples, is configured to provide output to a user using tactile, audio, or video stimuli. Output device 66, in one example, includes a presence-sensitive display, a sound card, a video graphics adapter card, or any other type of device for converting a signal into an appropriate form understandable to humans or machines. Additional examples of output device 66 include a speaker, a cathode ray tube (CRT) monitor, a liquid crystal display (LCD), organic light emitting diode (OLED), or any other type of device that can generate intelligible output to a user. In some examples, UI device 14 may include functionality of one or more of input devices 62 and/or output devices 66.

Wearable computing device 12 also can include UI device 14. In some examples, UI device 14 is configured to receive tactile, audio, or visual input. In addition to receiving input from a user, UI device 14 can be configured to output content such as a GUI for display at a display device, such as a presence-sensitive display. In some examples, UI device 14 can include a presence-sensitive display that displays a GUI and receives input from a user using capacitive, inductive, and/or optical detection at or near the presence sensitive display. In some examples, UI device 14 is both one of input devices 62 and one of output devices 66.

In some examples, UI device 14 of wearable computing device 12 may include functionality of input devices 62 and/or output devices 66. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y,z) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 66.

As illustrated in FIG. 2, wearable computing device 12 may also include motion module 19. Motion module 19, in some examples, may perform one or more functions to determine motion data corresponding to movements of wearable computing device 12. For instance, motion module 19 may receive data from one or more sensors 20 and determine motion data based on the received data. Motion module 19 may provide the determined motion data to other components of wearable computing device 12, such as communication module 12.

Wearable computing device 12 may include operating system 74. Operating system 74, in some examples, controls the operation of components of wearable computing device 12. For example, operating system 74, in one example, facilitates the communication of UI module 16 and communication module 17 with processors 60, communication units 64, storage devices 70, input devices 62, and output devices 66. UI module 16, communication module 17, and motion module 19 can each include program instructions and/or data that are executable by wearable computing device 12 (e.g., by one or more processors 60). As one example, UI module 16 can include instructions that cause wearable computing device 12 to perform one or more of the operations and actions described in the present disclosure.

Wearable computing device 12 can include additional components that, for clarity, are not shown in FIG. 2. For example, wearable computing device 12 can include a battery to provide power to the components of wearable computing device 12. Similarly, the components of wearable computing device 12 shown in FIG. 2 may not be necessary in every example of wearable computing device 12. For example, in some configurations, wearable computing device 12 may not include input devices 62.

In accordance with one or more aspects of this disclosure, communication module 7 may be operated by processors 40 receive an indication of an incoming communication. The incoming communication may be received from an external device, or may be received from another component of mobile computing device 2. Where the incoming communication is received from an external device, communication module 7 may receive the communication via one or more of communication units 44. Communication module 7 may then be operable by processors 40 to provide the incoming communication to privacy module 10.

Privacy module 10 may be operable by processors 40 to receive the incoming communication and determine that the incoming communication includes private information. As discussed above, privacy module 10 may be operable by processors 40 to determine that the incoming communication includes private information based on, for example, one or more predefined privacy settings, the sender of the incoming communication, and/or the content of the incoming communication. As one example, where the incoming communication includes an image, privacy module 10 may be operable by processors 40 to determine that the incoming communication includes private information by at least identifying an object included in the image. Privacy module 10 may be operable by processors 40 to perform one or more known image recognition techniques to identify object in the image. For instance, privacy module 10 may be operable by processors 40 to determine a portion of image data from the image. More specifically, privacy module 10 may be operable by processors 40 to select a portion of the image data that represents an object and determine a signature that represents the object. Privacy module 10 may be operable by processors 40 to determine a confidence value that indicates a likelihood that the image signature matches an object signature associated with private information. When the determined confidence value is greater than a predetermined value, privacy module 10 may be operable by processors 40 to determine that the incoming communication includes private information. In some examples, privacy module 10 may be operable by processors 40 to offload the determination that the incoming communication includes private information to an external device, such as a server. In some examples, the incoming communication may include a flag that indicates whether or not the incoming communication includes private information. For instance, the flag may be a privacy bit and/or a Boolean variable that, when set to a certain state (i.e., "1"), indicates whether or not the incoming communication includes private information. In some examples, the flag may be set by the sender of the communication. In some examples, the flag may be set by an external device, such as a server. In such examples, privacy module 10 may be operable by processors 40 to determine that the incoming communication includes private information based on the flag. Privacy module 10 may then be operable by processors 40 to provide an indication of the incoming communication that includes non-private information to communication module 7. In some examples, the indication may include a graphical indication.

Communication module 7 may be operable to receive the indication and output the indication to communication module 17 of wearable computing device 12. For instance, communication module 7 may cause one or more of communication units 44 to transmit a graphical indication to one or more of communication units 64 which in turn may provide the graphical indication to communication module 17.

In any case, communication module 17 may be operable by processors 60 to receive the indication and provide the received indication to UI module 16. UI module 16 may be operable by processors 60 to cause one or more of output devices 66 to display the indication. For example, UI module 16 may cause a display included in output devices 66 to display a graphical user interface (GUI) that includes the graphical indication.

A user of mobile computing device 2 and/or wearable computing device 12 may attempt to directly view wearable computing device 12. In some examples, the user may attempt to directly view wearable computing device 12 in response to observing graphical indication. In other examples, the user may attempt to directly view wearable computing device 12 as part of an effort to obtain some other information provided by wearable computing device 12. For instance, where wearable computing device 12 is a wrist watch, the user may attempt to directly view wearable computing device 12 in an effort to obtain the time. In any case, in attempting to view wearable computing device 12, the user may move the body part on which wearable computing device 12 is worn. Because wearable computing device 12 is worn on the body part, the user's motion causes wearable computing device 12 to correspondingly move.

As wearable computing device 12 correspondingly moves with the user, motion module 19 may be operable by processors 60 to determine motion data corresponding to the motion of wearable computing device 12. In some examples, one or more of sensors 20 may register the motion and send data to motion module 19, and motion module 19 may be operable by processors 60 to determine motion data corresponding to the motion of wearable computing device 12 based on data received from one or more of sensors 20. Motion module 19 may be operable by processors 60 to output the determined motion data to communication module 17.

Communication module 17 may be operable by processors 60 to receive the motion data and output the motion data to communication module 7 of mobile computing device 2. In some examples, communication module 17 may output the motion data to communication module 7 via one or more of communication units 64 and one or more communication units 44. In other words, communication module 17 may cause one or more of communication units 64 to transmit the motion data to one or more of communication units 44 which in turn may provide the motion data to communication module 7.

In any case, communication module 7 may be operable by processors 40 to receive the motion data and provide the motion data to motion module 9. Motion module 9 may be operable by processors 40 to determine, based on the motion data, that the user is likely viewing wearable computing device 12. For instance, motion module 9 may analyze the data and determine that the user is likely viewing wearable computing device 12 if the motion data indicates that a wrist of the user has rotated. Specifically, if wearable computing device 12 is worn such that the display that outputs the graphical indication is proximal to the posterior surface of the wrist, motion module 9 may determine that the user is likely viewing wearable computing device 12 if the motion data indicates that the wrist has been internally rotated. Conversely, if wearable computing device 12 is worn such that the display that outputs the graphical indication is proximal to the anterior surface of the wrist, motion module 9 may determine that the user is likely viewing wearable computing device 12 if the motion data indicates that the wrist has been externally rotated. In some examples, motion module 9 may include a setting that indicates which position the user wears wearable computing device 12 (e.g., anterior surface/posterior surface, left arm/right arm). Motion module 9 may be operable by processors 40 to determine at which position the user wears wearable computing device 12. Motion module 9 may be operable by processors 40 to determine that the user is likely viewing wearable computing device 12 if the motion data indicates that an elbow of the user has flexed, and/or if the motion data indicates that a shoulder of the user has flexed. In any case, motion module 9 may be operable by processors 40 to send an indication to communication module 7 and/or privacy module 10.

Privacy module 10 may be operable by processors 40 to receive the indication and provide the private information included in the incoming communication to communication module 7. For example, privacy module 10 may provide the private information to communication module 7 in response to receiving the indication from motion module 9.

Communication module 7 may be operable to receive the indication and/or private information and output an indication of the private information to communication module 17 of wearable computing device 12. In some examples, the indication of the private information may include some or all of the private information. In some examples, communication module 7 may output the indication of the private information to communication module 17 via one or more of communication units 44 and one or more communication units 64. In other words, communication module 7 may cause one or more of communication units 44 to transmit the indication of the private information to one or more of communication units 64 which in turn may provide the indication of the private information to communication module 17.

In any case, communication module 17 may be operable by processors 60 to receive the indication of the private information and provide the received indication to UI module 16. UI module 16 may be operable by processors 60 to cause one or more of output devices 66 to display the indication of the private information. For example, UI module 16 may cause a display included in output devices 66 to display a graphical user interface (GUI) that includes the indication of the private information. In any case, by outputting the indication of the private information when the user is viewing wearable computing device 12, mobile computing device 2 may prevent other persons from observing the user's private information from wearable computing device 12 without significantly impairing the user's ability to interact with wearable computing device 12 and/or mobile computing device 2.

Figure 3:
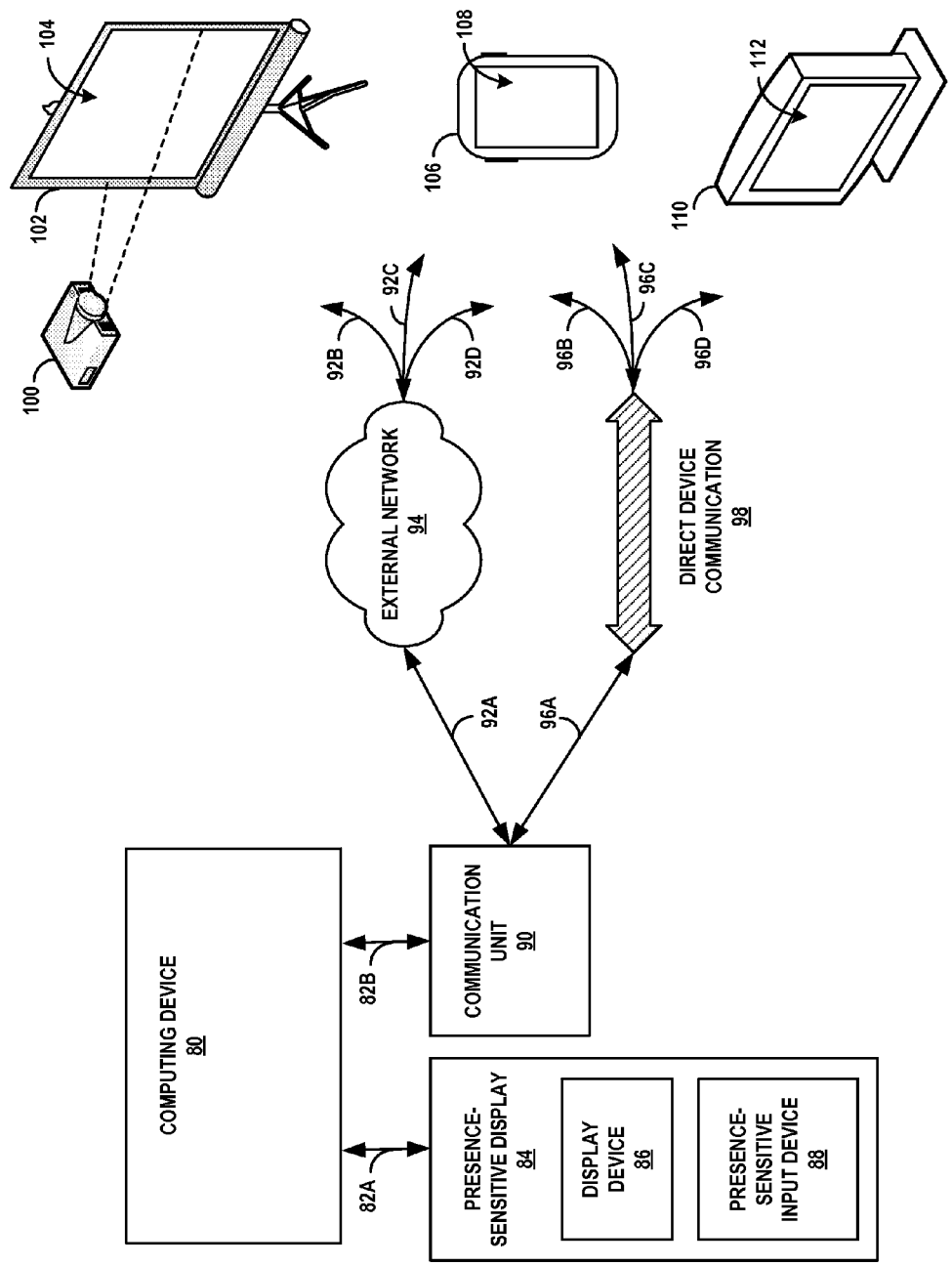
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 80, presence-sensitive display 84, communication unit 90, projector 100, projector screen 102, mobile device 106, and visual display device 110. Although shown for purposes of example in FIGS. 1 and 2 as stand-alone mobile computing device 2 and/or wearable computing device 12, a computing device such as computing device 80 may, generally, be any component or system that includes a processor or other suitable computing environment for executing software instructions and, for example, need not include a presence-sensitive display.

As shown in the example of FIG. 3, computing device 80 may be a processor that includes functionality as described with respect to processor 40 and/or processor 60 in FIG. 2. In such examples, computing device 80 may be operatively coupled to presence-sensitive display 84 by a communication channel 82A, which may be a system bus or other suitable connection. Computing device 80 may also be operatively coupled to communication unit 90, further described below, by a communication channel 82B, which may also be a system bus or other suitable connection. Although shown separately as an example in FIG. 3, computing device 80 may be operatively coupled to presence-sensitive display 84 and communication unit 90 by any number of one or more communication channels.

In other examples, such as illustrated previously by mobile computing device 2 and/or wearable computing device 12 in FIGS. 1-2, a computing device may refer to a portable or mobile device such as mobile phones (including smart phones), wearable computing devices (including smart watches) laptop computers, etc. In some examples, a computing device may be a desktop computers, tablet computers, smart television platforms, cameras, personal digital assistants (PDAs), servers, mainframes, etc.

Presence-sensitive display 84, like UI device 4 or UI device 14 as shown in FIG. 1, may include display device 86 and presence-sensitive input device 88. Display device 86 may, for example, receive data from computing device 80 and display the graphical content. In some examples, presence-sensitive input device 88 may determine one or more user inputs (e.g., continuous gestures, multi-touch gestures, single-touch gestures, etc.) at presence-sensitive display 84 using capacitive, inductive, and/or optical recognition techniques and send indications of such user input to computing device 80 using communication channel 82A. In some examples, presence-sensitive input device 88 may be physically positioned on top of display device 86 such that, when a user positions an input unit over a graphical element displayed by display device 86, the location at which presence-sensitive input device 88 corresponds to the location of display device 86 at which the graphical element is displayed. In other examples, presence-sensitive input device 88 may be positioned physically apart from display device 86, and locations of presence-sensitive input device 88 may correspond to locations of display device 86, such that input can be made at presence-sensitive input device 88 for interacting with graphical elements displayed at corresponding locations of display device 86.

As shown in FIG. 3, computing device 80 may also include and/or be operatively coupled with communication unit 90. Communication unit 90 may include functionality of communication unit 44 and/or communication unit 64 as described in FIG. 2. Examples of communication unit 90 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 80 may also include and/or be operatively coupled with one or more other devices, e.g., input devices, output devices, memory, storage devices, etc. that are not shown in FIG. 3 for purposes of brevity and illustration.

FIG. 3 also illustrates a projector 100 and projector screen 102. Other such examples of projection devices may include electronic whiteboards, holographic display devices, and any other suitable devices for displaying graphical content. Projector 100 and projector screen 102 may include one or more communication units that enable the respective devices to communicate with computing device 80. In some examples, the one or more communication units may enable communication between projector 100 and projector screen 102. Projector 100 may receive data from computing device 80 that includes graphical content. Projector 100, in response to receiving the data, may project the graphical content onto projector screen 102. In some examples, projector 100 may determine one or more user inputs (e.g., continuous gestures, multi-touch gestures, single-touch gestures, etc.) at projector screen using optical recognition or other suitable techniques and send indications of such user input using one or more communication units to computing device 80. In such examples, projector screen 102 may be unnecessary, and projector 100 may project graphical content on any suitable medium and detect one or more user inputs using optical recognition or other such suitable techniques.

Projector screen 102, in some examples, may include a presence-sensitive display 104. Presence-sensitive display 104 may include a subset of functionality or all of the functionality of UI device 4 and/or UI device 14 as described in this disclosure. In some examples, presence-sensitive display 84 may include additional functionality. Projector screen 102 (e.g., an electronic whiteboard), may receive data from computing device 80 and display the graphical content. In some examples, presence-sensitive display 104 may determine one or more user inputs (e.g., continuous gestures, multi-touch gestures, single-touch gestures, etc.) at projector screen 102 using capacitive, inductive, and/or optical recognition techniques and send indications of such user input using one or more communication units to computing device 80.

FIG. 3 also illustrates mobile device 106 and visual display device 110. Mobile device 106 and visual display device 110 may each include computing and connectivity capabilities. Examples of mobile device 106 may include e-reader devices, convertible notebook devices, hybrid slate devices, wearable computing devices, etc. Examples of visual display device 110 may include other semi-stationary devices such as televisions, computer monitors, etc. As shown in FIG. 3, mobile device 106 may include a presence-sensitive display 108. Visual display device 110 may include a presence-sensitive display 112. Presence-sensitive displays 108, 112 may include a subset of functionality or all of the functionality of UI device 4 and/or UI device 14 as described in this disclosure. In some examples, presence-sensitive displays 108, 112 may include additional functionality. In any case, presence-sensitive display 112, for example, may receive data from computing device 80 and display the graphical content. In some examples, presence-sensitive display 112 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 80.

As described above, in some examples, computing device 80 may output graphical content for display at presence-sensitive display 84 that is coupled to computing device 80 by a system bus or other suitable communication channel. Computing device 80 may also output graphical content for display at one or more remote devices, such as projector 100, projector screen 102, mobile device 106, and visual display device 110. For instance, computing device 80 may execute one or more instructions to generate and/or modify graphical content in accordance with techniques of the present disclosure. Computing device 80 may output the data that includes the graphical content to a communication unit of computing device 80, such as communication unit 90. Communication unit 90 may send the data to one or more of the remote devices, such as projector 100, projector screen 102, mobile device 106, and/or visual display device 110. In this way, computing device 80 may output the graphical content for display at one or more of the remote devices. In some examples, one or more of the remote devices may output the graphical content at a presence-sensitive display that is included in and/or operatively coupled to the respective remote devices.

In some examples, computing device 80 may not output graphical content at presence-sensitive display 84 that is operatively coupled to computing device 80. In other examples, computing device 80 may output graphical content for display at both a presence-sensitive display 84 that is coupled to computing device 80 by communication channel 82A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 80 and output for display at presence-sensitive display 84 may be different than graphical content display output for display at one or more remote devices.

Computing device 80 may send and receive data using any suitable communication techniques. For example, computing device 80 may be operatively coupled to external network 94 using network link 92A. Each of the remote devices illustrated in FIG. 3 may be operatively coupled to network external network 94 by one of respective network links 92B, 92C, and 92D. External network 94 may include network hubs, network switches, network routers, etc., that are operatively inter-coupled thereby providing for the exchange of information between computing device 80 and the remote devices illustrated in FIG. 3. In some examples, network links 92A-92D may be Ethernet, ATM or other network connections. Such connections may be wireless and/or wired connections.

In some examples, computing device 80 may be operatively coupled to one or more of the remote devices included in FIG. 3 using direct device communication 98. Direct device communication 98 may include communications through which computing device 80 sends and receives data directly with a remote device, using wired or wireless communication. That is, in some examples of direct device communication 98, data sent by computing device 80 may not be forwarded by one or more additional devices before being received at the remote device, and vice-versa. Examples of direct device communication 98 may include Bluetooth, Near-Field Communication, Universal Serial Bus, Wi-Fi, infrared, etc. One or more of the remote devices illustrated in FIG. 3 may be operatively coupled with computing device 80 by communication links 96A-96D. In some examples, communication links 96A-96D may be connections using Bluetooth, Near-Field Communication, Universal Serial Bus, infrared, etc. Such connections may be wireless and/or wired connections.

In accordance with techniques of the disclosure, computing device 80 may be operatively coupled to visual display device 110 using external network 94. Computing device 80 may output a graphical indication of an incoming communication for display at presence-sensitive display 112. For instance, computing device 80 may send data that includes a representation of the graphical indication to communication unit 90. Communication unit 90 may send the data that includes the representation of the graphical indication to visual display device 110 using external network 94. Visual display device 110, in response to receiving the data using external network 94, may cause presence-sensitive display 112 to output the graphical indication. In response to a user performing a gesture at presence-sensitive display 112 (e.g., at a region of presence-sensitive display 112 that outputs the graphical indication), visual display device 110 may send an indication of the gesture to computing device 80 using external network 94. Communication unit 90 of may receive the indication of the gesture, and send the indication to computing device 80.

In response to receiving an indication of at least one gesture detected at a presence-sensitive input device, computing device 80 may determine, based on the at least one gesture, that the user of computing device 80 is likely viewing visual display device 110. Computing device 80 may output an indication of private information included in the incoming communication for display at presence-sensitive display 112. For instance, computing device 80 may send data that includes a representation of the indication to communication unit 90. Communication unit 90 may send the data that includes the representation of the indication to visual display device 110 using external network 94. Visual display device 110, in response to receiving the data using external network 94, may cause presence-sensitive display 112 to output the indication of the private information.

Figure 4:
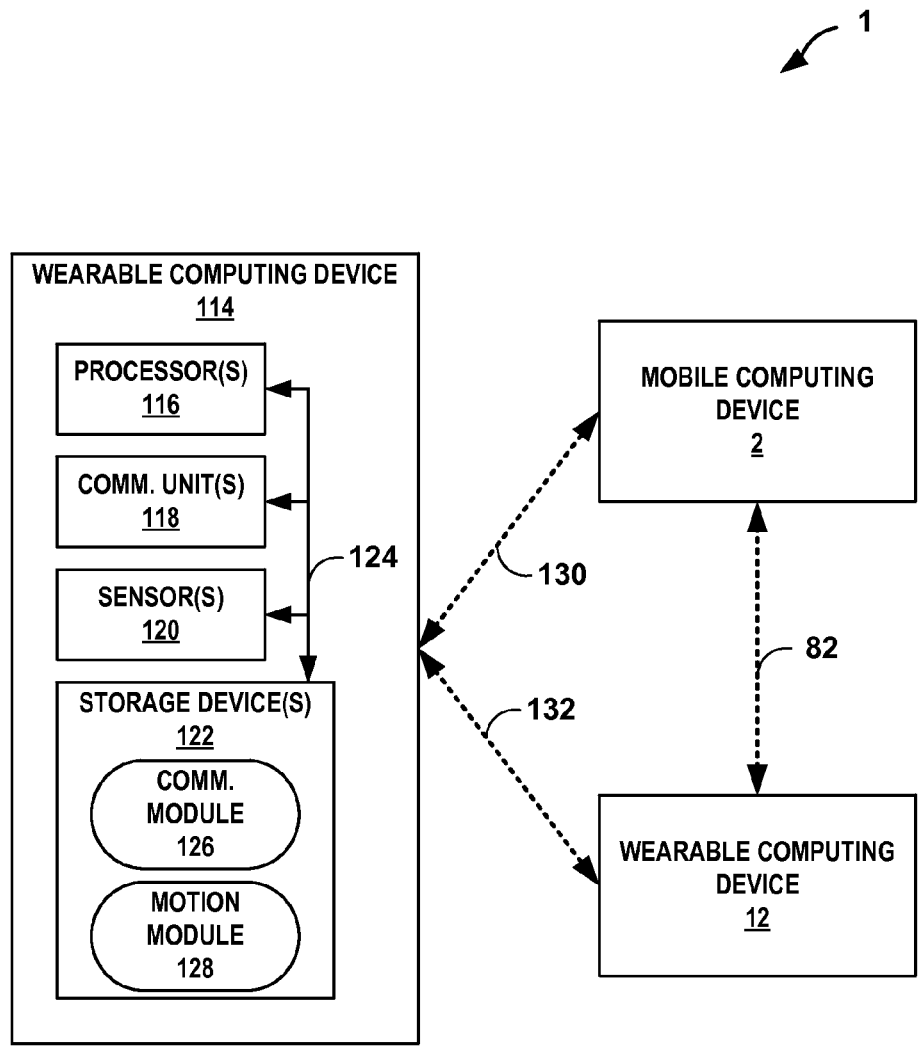
FIG. 4 is a block diagram illustrating an example system that includes a mobile computing device, a first wearable device, and a second wearable device, in accordance with one or more techniques of the present disclosure.

FIG. 4 is a block diagram illustrating an example system 1 that includes a mobile computing device, a first wearable computing device, and a second wearable computing device, in accordance with one or more techniques of the present disclosure. As shown in the example of FIG. 4, system 1 may include mobile computing device 2, wearable computing device 12, and wearable computing device 114. In some examples, either or both or wearable computing device 12 and wearable computing device 114 may include the functionality of mobile computing device 2. Examples of wearable computing device 114 may include, but are not limited to, headsets, earpieces, visors, eyeglasses, and attachments for eyeglasses. In some examples, wearable computing device 114 may be implanted within a user.

In the example of FIG. 4, wearable computing device 114 includes one or more processors 116, one or more communication units 118, one or more sensors 120, and one or more storage devices 122. In the example of FIG. 4, wearable computing device 114 further includes communication module 126, and motion module 128. Each of components 116, 118, 120, and 122 may be coupled (physically, communicatively, and/or operatively) using communication channels 124 for inter-component communication. In some examples, communication channels 124 may include a system bus, a network connection, an inter-process communication data structure, or any other method for communicating data. Communication module 126, and motion module 128 may also communicate information with one another, as well as with other components in wearable computing device 114.

One or more processors 116, in one example, are configured to implement functionality and/or process instructions for execution within wearable computing device 114. For example, processors 116 may be capable of processing instructions stored by storage device 122. Examples of one or more processors 116 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 122 may be configured to store information within wearable computing device 114 during operation. Storage devices 122, in some examples, include a computer-readable storage medium or computer-readable storage device. In some examples, storage devices 122 include a temporary memory, meaning that a primary purpose of storage device 122 is not long-term storage. Storage devices 122, in some examples, include a volatile memory, meaning that storage device 122 does not maintain stored contents when power is not provided to storage device 122. Examples of volatile memories include random access memories (RAM), dynamic random access memories (DRAM), static random access memories (SRAM), and other forms of volatile memories known in the art. In some examples, storage devices 122 are used to store program instructions for execution by processors 116. Storage devices 122, in some examples, are used by software or applications running on wearable computing device 114 (e.g., communication module 126) to temporarily store information during program execution.

In some examples, storage devices 122 may further include one or more storage device 122 configured for longer-term storage of information. In some examples, storage devices 122 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Wearable computing device 114, in some examples, also includes one or more communication units 118. Wearable computing device 114, in one example, utilizes communication unit 118 to communicate with external devices via one or more networks, such as one or more wireless networks. Communication unit 118 may be a network interface card, such as an Ethernet card, an optical transceiver, a radio frequency transceiver, or any other type of device that can send and receive information. Other examples of such network interfaces may include Bluetooth, 3G, and Wi-Fi radios computing devices as well as Universal Serial Bus (USB). In some examples, wearable computing device 114 utilizes communication unit 118 to wirelessly communicate with an external device such as a server, a mobile computing device, or a wearable computing device. For instance, wearable computing device 114 may utilize communication unit 118 to wirelessly communicate with mobile computing device 2 over link 130 and/or wearable computing device 12 over link 132. In some examples, communication unit 118 may receive input from other components of wearable computing device 114, such as communication module 126, that causes communication unit 118 to wirelessly communicate with an external device, such as communication unit 64 of wearable computing device 12 and/or communication unit 44 of mobile computing device 2.

As illustrated in FIG. 4, wearable computing device 114 may also include communication module 126. In some examples, communication module 126 may manage communications between wearable computing device 114 and a mobile computing device or another wearable computing device, such as mobile computing device 2 or wearable computing device 12. For instance, communication module 126 may exchange information with mobile computing device 2. As one example, communication module 126 may send motion data to mobile computing device 2. In some examples, communication module 126 may provide information to other components of wearable computing device 114. In some examples, communication module 126 manages communications between wearable computing device 114 and other devices via communication unit 118.

Wearable computing device 114 may also include one or more sensors 120. One or more of sensors 120 may be configured to measure the movement of wearable computing device 114. For instance, one or more of sensors 120 may be configured to measure the position, rotation, velocity, and/or acceleration of wearable computing device 114. A user associated with wearable computing device 114 may interact with wearable computing device 114 by moving wearable computing device 114. Examples of one of more of sensors 120 may include, but are not limited to, accelerometers and gyroscopes.

As illustrated in FIG. 4, wearable computing device 114 may also include motion module 128. Motion module 128, in some examples, may perform one or more functions to determine motion data corresponding to movements of wearable computing device 114. For instance, motion module 128 may receive data from one or more sensors 120 and determine motion data based on the received data. Motion module 128 may provide the determined motion data to other components of wearable computing device 114, such as communication module 126.

Figure 5A:
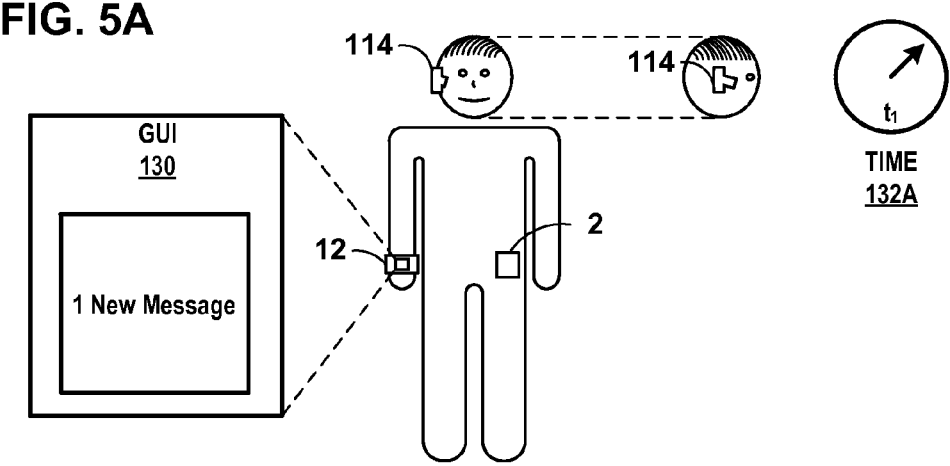
FIGS. 5A-5C are block diagrams illustrating an example system for managing the display of private information at a wearable device, in accordance with one or more techniques of the present disclosure.
Figure 5B:
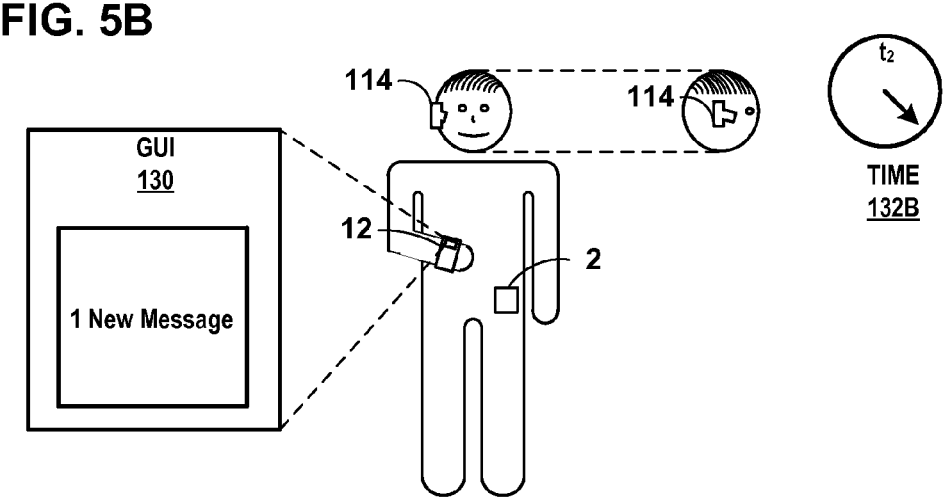
Figure 5C:
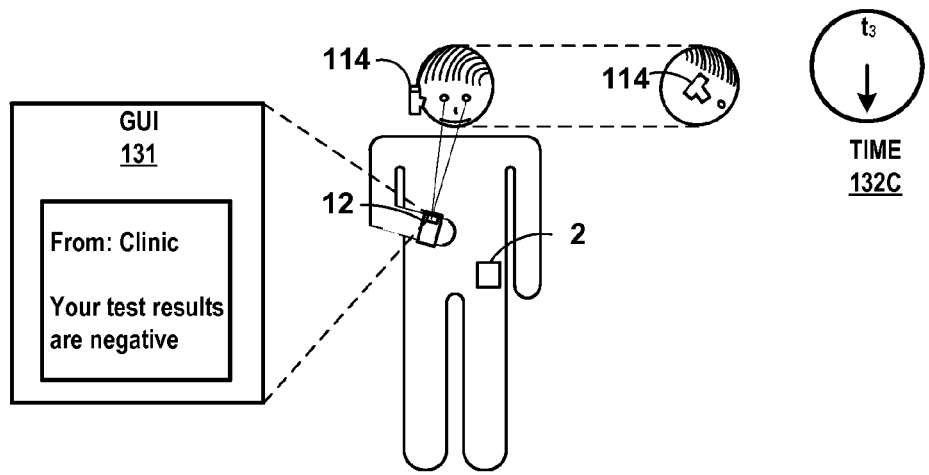

FIGS. 5A-5C are block diagrams illustrating an example system for managing the display of private information at a wearable computing device, in accordance with one or more techniques of the present disclosure. As shown in FIG. 5 and in accordance with the techniques of the present disclosure, a user may be associated with mobile computing device 2, wearable computing device 12, and wearable computing device 114. As illustrated in FIG. 5, a user may have mobile computing device 2 in his/her pocket, the user may wear wearable computing device 12 on his/her wrist or forearm, and the user may wear wearable computing device 114 on his/her head.

As discussed in detail throughout this disclosure, mobile computing device 2 may receive an indication of an incoming communication. Mobile computing device 2 may then determine that the incoming communication includes private information. Mobile computing device 2 may then cause an indication of the incoming communication to be outputted by a wearable computing device. For example, mobile computing device 2 may output, for display at wearable computing device 12, a graphical indication of the incoming communication. As another example, mobile computing device 2 may output an indication to one or both of wearable computing device 2 and wearable computing device 114 that causes one or both of wearable computing device 2 and wearable computing device 114 to beep and/or vibrate. As illustrated in FIG. 5A, mobile computing device 2 may output a graphical indication to wearable computing device 12 that causes wearable computing device 12 to output GUI 130 that includes a graphical indication including non-private information "1 New Message" at a first time 132A Again, as discussed in detail throughout this disclosure, the user associated with mobile computing device 2, wearable computing device 12, and wearable computing device 114 may attempt to view wearable computing device 12. In attempting to view wearable computing device 12, the user may move the body parts on which wearable computing device 12 and/or wearable computing device 114 are worn. In the example of FIGS. 5A-5C, in attempting to view wearable computing device 12, the user may move his/her wrist and his/her head. As discussed above, the user may move his/her arm by rotating his/her wrist, flexing his/her elbow, and/or flexing his/her shoulder. Additionally, the user may move his/her head by flexing his/her cervical spine (i.e., looking down) and/or rotating his/her head.

The movements of wearable computing device 114 are detected by one or more sensors, such as sensors 120 of FIG. 4. The one or more sensors may output motion data corresponding to the movement of wearable computing device 114 to a communication module, such as communication module 126 of FIG. 4. The communication module may receive the motion data and cause a communication unit, such as communication unit 118 of FIG. 4, to send the motion data to mobile computing device 2 and/or wearable computing device 12. Additionally, as discussed above, the movements of wearable computing device 12 may be detected by one or more sensors, such as sensors 20 of FIGS. 1 and 2. One or more of the sensors may output motion data corresponding to the movement of wearable computing device 12 to a communication module, such as communication module 17 of FIGS. 1 and 2. The communication module may receive the motion data and cause a communication unit, such as communication unit 64 of FIG. 2, to send the motion data to mobile computing device 2 and/or wearable computing device 114.

The movements of wearable computing device 114 and wearable computing device 12 may be detected at different times. For instance, the movement of wearable computing device 12 may be detected at a first time, and the movement of wearable computing device 114 may be detected at a second time. The first time may occur earlier than, later than, contemporaneously with the second time. In the example of FIGS. 5A-5C, the movement of wearable computing device 12 is detected at time 132B and the movement of wearable computing device 114 is detected at time 132C. In other words, the user moved his/her arm before moving his/her head. When sending motion data to other devices, wearable computing device 12 and wearable computing device 114 may include a timestamp corresponding to the time at which the motion data was determined.

Mobile computing device 2 may receive the motion data from wearable computing device 12 and wearable computing device 114 and determine, based on the received motion data, that the user is likely viewing wearable computing device 12. As discussed above, mobile computing device 2 may analyze the motion data from wearable computing device 12 and determine that the user has rotated his/her wrist at a first time. In the example of FIG. 5B, mobile computing device 2 may determine that the user rotated his/her wrist at time 132B. Additionally, mobile computing device 2 may analyze the motion data from wearable computing device 114 and determine that the user has flexed his/her cervical spine and/or rotated his/her head at a second time. In the example of FIG. 5C, mobile computing device 2 may determine that the user has flexed his/her cervical spine at time 132C. Mobile computing device 2 may determine that the user is likely viewing wearable computing device 12 if the movement of wearable computing device 12 was substantially synchronous with the movement of wearable computing device 114. To determine that the movement of wearable computing device 12 was substantially synchronous with the movement of wearable computing device 114, mobile computing device 2 may determine that a difference between the time at which wearable computing device 12 moved and the time at which wearable computing device 114 moved is less than a threshold. Some example threshold values include: 20 milliseconds, 300 milliseconds, and 1 second. For example, mobile computing device 2 that the movement of wearable computing device 12 was substantially synchronous with the movement of wearable computing device 114 if the result of subtracting time 132B from time 132C is less than a threshold.

In response to determining that the movement of wearable computing device 12 was substantially synchronous with the movement of wearable computing device 114, mobile computing device 2 may determine that the user is likely viewing wearable computing device 12 and output, for display at wearable computing device 12, an indication of the private information. In the example of FIG. 5C, in response to receiving the indication of the private information, wearable computing device 12 may output GUI 131 that includes a graphical indication including private information, "From: Clinic, Your test results are negative." In other examples, the graphical indication may include any combination of images and text. In any case, by basing the determination that the user is likely viewing wearable computing device 12 on motion data received from both wearable computing device 12 and wearable computing device 114, the likelihood that the determination will be accurate is increased.

Figure 6:
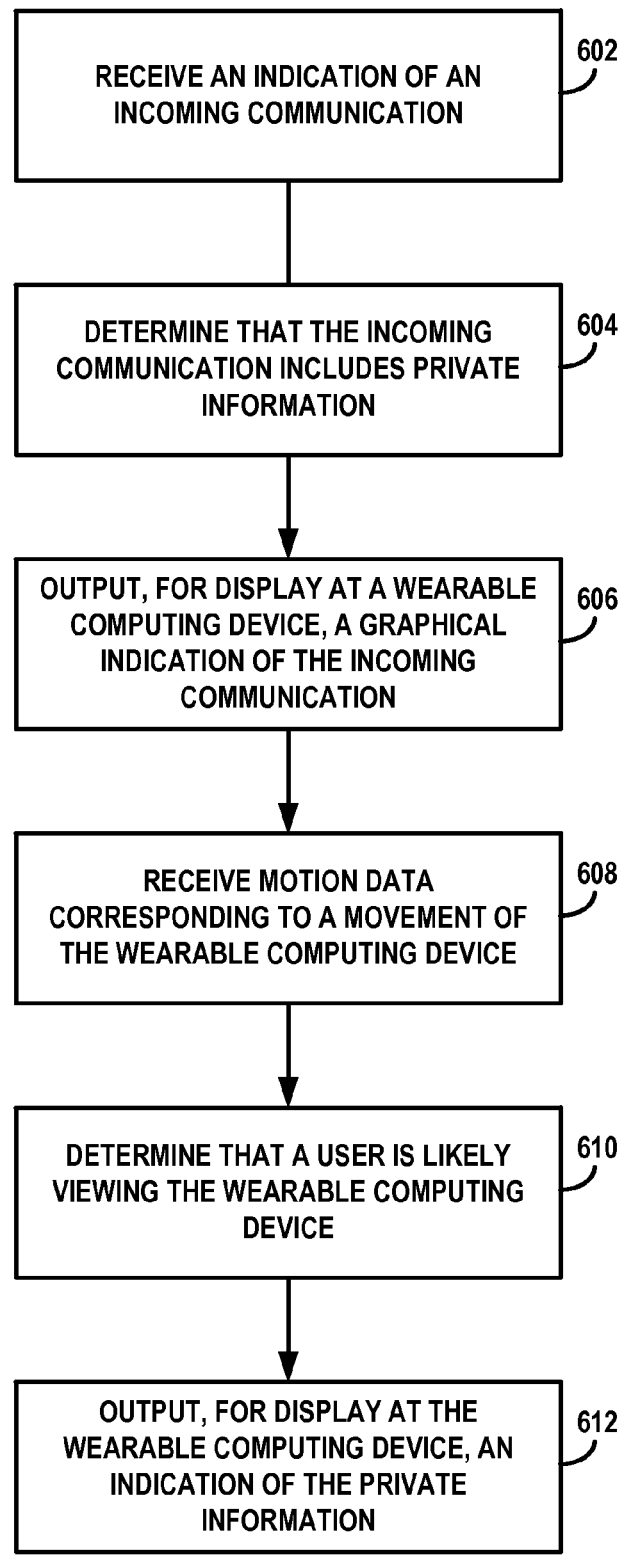
FIG. 6 is a flow diagram illustrating example operations of a mobile computing device to manage the display of private information at a wearable device, in accordance with one or more techniques of the present disclosure.

FIG. 6 is a flow diagram illustrating example operations of a mobile computing device to manage the display of private information at a wearable computing device, in accordance with one or more techniques of the present disclosure. The techniques of FIG. 6 may be performed by one or more processors of a computing device, such as mobile computing device 2 and/or wearable computing device 12 illustrated in FIG. 1, FIG. 2, FIG. 4, and FIG. 5, or wearable computing device 114 illustrated in FIG. 4, and FIG. 5. For purposes of illustration, the techniques of FIG. 6 are described within the context of mobile computing device 2 of FIG. 1, FIG. 2, FIG. 4, and FIG. 5, although computing devices having configurations different than that of mobile computing device 2 may perform the techniques of FIG. 6.

In accordance with one or more techniques of the disclosure, communication module 7 of mobile computing device 2 may receive an indication of an incoming communication (602). As described above, the incoming communication may be received from, for example, a component of mobile computing device 2, an external server, or a wearable computing device. Privacy module 10 of mobile computing device 2 may then determine that the incoming communication includes private information (604). As discussed above, privacy module 10 may determine that the incoming communication includes private information based on, for example, one or more predefined privacy settings, the sender of the incoming communication, and/or the content of the incoming communication. Communication module 7 may then output, for display at a wearable computing device (e.g., wearable computing device 12), a graphical indication of the incoming communication (606).

Communication module 7 of mobile computing device 2 may then receive, from the wearable computing device, motion data corresponding to a movement of the wearable computing device (608). As discussed above, the wearable computing device may be worn on a wrist of a user of the wearable computing device and/or mobile computing device 2 and the movement of the wearable computing device may correspond to a movement of the user. In some examples, such as when the wearable computing device is a watch and is worn on the wrist of the user such that the display of the wearable computing device is on the posterior surface of the wrist, the movement of the user may include an internal rotation of the wrist. In some examples, the movement of the user may further include a flexion of a shoulder of the user and a flexion of an elbow of the user.

As discussed above, the wearable computing device may be a first wearable computing device and communication module 7 may further receive, from a second wearable computing device (e.g., wearable computing device 114), motion data corresponding to a movement of the second wearable computing device. In some examples, the second wearable computing device may be worn on a head of the user and the movement of the second wearable computing device may correspond to a movement of the user. In such examples, the movement of the user may include a flexion of a cervical spine of the user and a rotation of the head of the user.

Motion module 9 of mobile computing device 2 may then determine, based on the motion data, that the user is likely viewing the wearable computing device (610). In examples that include a first wearable computing device and a second wearable computing device, the determination that the user is likely viewing the first wearable computing device may be further based on motion data received from the second device. For instance, motion module 9 may determine that the user is likely viewing the first wearable computing device where the motion data indicates that the user internally rotated his/her wrist, flexed his/her shoulder, flexed his/her elbow, flexed his/her cervical spine, and/or rotated his/her head. In some examples, determination may be based on a determination that the movement of the first wearable computing device was substantially synchronous with the movement of the second wearable computing device. For instance, where the movement of the first wearable computing device occurs at a first time, the movement of the second wearable computing device occurs at a second time, motion module 9 may determine that the movement of the first wearable computing device was substantially synchronous with the movement of the second wearable computing device by determining that a difference between the first time and the second time is less than a threshold.

Communication module 7 may then output, for display at the wearable computing device, an indication of the private information (612).

To the extent that the techniques of this disclosure are described as being performed by the mobile computing device and/or the one or more wearable computing devices, such description is purely illustrative. In other words, any combination of the techniques of this disclosure may be performed by any combination of the computing devices (e.g., the mobile computing device and the one or more wearable computing devices). For instance, one of the wearable computing devices may perform all of the operations without assistance from the mobile computing device. In some examples, the system may not even include the mobile computing device (i.e., the system may only include one or more wearable computing devices).

Example 1

A method comprising: receiving a first indication of an incoming communication; determining that the incoming communication includes private information; outputting, for display at a wearable computing device, a second indication of the incoming communication, wherein the second indication includes non-private information; determining, based on motion data generated by the wearable computing device, that a user of the wearable computing device is likely viewing the wearable computing device; and outputting, for display at the wearable computing device, an indication of the private information.

Example 2

The method of example 1, wherein receiving the first indication of the incoming communication comprises: receiving, by a mobile computing device and from a server device, the first indication of the incoming communication; or receiving, by the wearable computing device and from the server device, the first indication of the incoming communication, wherein determining that the incoming communication includes the private information comprises: determining, by the mobile computing device, that the incoming communication includes the private information; or determining, by the wearable computing device, that the incoming communication includes the private information, wherein outputting, for display at the wearable computing device, the second indication of the incoming communication comprises: outputting, by the mobile computing device and for display at the wearable computing device, the second indication of the incoming communication; or outputting, by the wearable computing device and for display at the wearable computing device, the second indication of the incoming communication, wherein determining, based on the motion data generated by the wearable computing device, that the user of the wearable computing device is likely viewing the wearable computing device comprises: determining, by the mobile computing device and based on the motion data, that the user of both the mobile computing device and the wearable computing device is likely viewing the wearable computing device; or determining, by the wearable computing device and based on the motion data, that the user of the wearable computing device is likely viewing the wearable computing device, and wherein outputting, for display at the wearable computing device, the indication of the private information comprises: outputting, by the mobile computing device and for display at the wearable computing device, the indication of the private information; or outputting, by the wearable computing device and for display at the wearable computing device, the indication of the private information.

Example 3

The method of any combination of examples 1-2, wherein the wearable computing device is a first wearable computing device, the method further comprising: receiving, from a second wearable computing device, motion data corresponding to a movement of the second wearable computing device, wherein the determination that the user is likely viewing the first wearable computing device is further based on the motion data received from the second wearable computing device.

Example 4

The method of any combination of examples 1-3, wherein the first wearable computing device is worn on a wrist of the user, and wherein the second wearable computing device is worn on a head of the user.

Example 5

The method of any combination of examples 1-4, wherein the movement of the second wearable computing device corresponds to a movement of the user, and wherein the movement of the user comprises a flexion of a cervical spine of the user and a rotation of a head of the user.

Example 6

The method of any combination of examples 1-5, wherein the movement of the first wearable computing device occurs at a first time, wherein the movement of the second wearable computing device occurs at a second time, and wherein determining that the user of the first wearable computing device is likely viewing the first wearable computing device comprises determining that a difference between the first time and the second time is less than a threshold.

Example 7

The method of any combination of examples 1-6, wherein the wearable computing device is worn on a wrist of the user, wherein the movement of the wearable computing device corresponds to a movement of the user, and wherein the movement of the user comprises an internal rotation of the wrist.

Example 8

The method of any combination of examples 1-7, wherein the movement of the user further comprises a flexion of a shoulder of the user, and a flexion of an elbow of the user.

Example 9

The method of any combination of examples 1-8, wherein determining that the incoming communication includes private information comprises determining, based on one or more of: a sender of the incoming communication, content of the incoming communication, a privacy flag included in the incoming communication, and one or more predefined privacy settings, that the incoming communication includes private information.

Example 10

The method of any combination of examples 1-9, wherein the incoming communication includes an image, and wherein determining that the incoming communication includes private information comprises: identifying an object included in the image; and determining, based on the object included in the image, that the incoming communication includes private information.

Example 11

The method of any combination of examples 1-10, wherein identifying the object included in the image further comprises: determining a portion of image data from the image; determining an image signature that represents the portion of selected image data; determining a confidence value that indicates a likelihood that the image signature matches an object signature associated with private information; and responsive to determining that the confidence value is greater than a predetermined value, determining that the incoming communication includes private information.

Example 12

The method of any combination of examples 1-11, wherein the second indication of the incoming communication is a graphical indication of the incoming communication.

Example 13

The method of any combination of examples 1-12, wherein the non-private information includes the identity of a sender of the incoming communication, and wherein the private information includes at least a portion of content of the incoming communication.

Example 14

The method of any combination of examples 1-13, wherein receiving the first indication of the incoming communication comprises: receiving, by a mobile computing device and from a server device, the first indication of the incoming communication, wherein determining that the incoming communication includes the private information comprises: determining, by the mobile computing device, that the incoming communication includes the private information, wherein outputting, for display at the wearable computing device, the second indication of the incoming communication comprises: outputting, by the mobile computing device and for display at the wearable computing device, the second indication of the incoming communication, wherein determining, based on the motion data generated by the wearable computing device, that the user of the wearable computing device is likely viewing the wearable computing device comprises: determining, by the mobile computing device and based on the motion data, that the user of both the mobile computing device and the wearable computing device is likely viewing the wearable computing device, and wherein outputting, for display at the wearable computing device, the indication of the private information comprises: outputting, by the mobile computing device and for display at the wearable computing device, the indication of the private information.

Example 15

The method of any combination of examples 1-14, wherein receiving the first indication of the incoming communication comprises: receiving, by the wearable computing device and from the server device, the first indication of the incoming communication, wherein determining that the incoming communication includes the private information comprises: determining, by the wearable computing device, that the incoming communication includes the private information, wherein outputting, for display at the wearable computing device, the second indication of the incoming communication comprises: outputting, by the wearable computing device and for display at the wearable computing device, the second indication of the incoming communication, wherein determining, based on the motion data generated by the wearable computing device, that the user of the wearable computing device is likely viewing the wearable computing device comprises: determining, by the wearable computing device and based on the motion data, that the user of the wearable computing device is likely viewing the wearable computing device, and wherein outputting, for display at the wearable computing device, the indication of the private information comprises: outputting, by the wearable computing device and for display at the wearable computing device, the indication of the private information.

Example 16

A mobile computing device comprising: one or more processors; and at least one module executable by the one or more processors to: receive a first indication of an incoming communication; determine that the incoming communication includes private information; output, for display at a wearable computing device, a second indication of the incoming communication, wherein the second indication includes non-private information; receive, from the wearable computing device, motion data corresponding to a movement of the wearable computing device; determine, based on the motion data, that a user of the mobile computing device is likely viewing the wearable computing device; and output, for display at the wearable computing device, an indication of the private information.

Example 17

The mobile computing device of example 16, wherein the wearable computing device is a first wearable computing device, and wherein the at least one module is further executable by the one or more processors to: receive, from a second wearable computing device, motion data corresponding to a movement of the second wearable computing device, wherein the determination that the user is likely viewing the first wearable computing device is further based on the motion data received from the second wearable computing device.

Example 18

The mobile computing device of any of examples 16-17, wherein the movement of the first wearable computing device occurs at a first time, wherein the movement of the second wearable computing device occurs at a second time, and wherein the at least one module is further executable by the one or more processors to determine that the user of the mobile computing device is likely viewing the first wearable computing device where a difference between the first time and the second time is less than a threshold.

Example 19

The mobile computing device of any of examples 16-18, wherein the wearable computing device is worn on a wrist of the user, wherein the movement of the wearable computing device corresponds to a movement of the user, and wherein the movement of the user comprises an internal rotation of the wrist.

Example 20

The mobile computing device of any of examples 16-19, wherein the at least one module is further executable by the one or more processors to determine, based on one or more of: a sender of the incoming communication, content of the incoming communication, a privacy flag included in the incoming communication, and one or more predefined privacy settings, that the incoming communication includes private information.

Example 21

The mobile computing device of any of examples 16-20, wherein the incoming communication includes an image, wherein the at least one module is further executable by the one or more processors to determine that the incoming communication includes private information by at least: identifying an object included in the image; and determining, based on the object included in the image, that the incoming communication includes private information.

Example 22

A computer-readable storage medium that stores instructions that, when executed by one or more processors of a computing device, cause the one or more processors to: receive a first indication of an incoming communication; determine that the incoming communication includes private information; output, for display at a wearable computing device, a second indication of the incoming communication, wherein the second indication includes non-private information; determine, based on motion data generated by the wearable computing device, that a user of the wearable computing device is likely viewing the wearable computing device; and output, for display at the wearable computing device, an indication of the private information.

Example 23

The computer-readable storage medium of example 22, wherein the computing device is the wearable computing device or a mobile computing device, wherein the instructions that cause the one or more processors of the computing device to receive the first indication of the incoming communication comprise instructions that: cause the one or more processors of the mobile computing device to receive the first indication of the incoming communication; or cause the one or more processors of the wearable computing device to receive the first indication of the incoming communication, wherein the instructions that cause the one or more processors of the computing device to output, for display at the wearable computing device, the second indication of the incoming communication comprise instructions that: cause the one or more processors of the mobile computing device to output, for display at the wearable computing device, the second indication of the incoming communication; or cause the one or more processors of the wearable computing device to output, for display at the wearable computing device, the second indication of the incoming communication, wherein the instructions that cause the one or more processors of the computing device to determine, based on the motion data generated by the wearable computing device, that the user of the wearable computing device is likely viewing the wearable computing device comprise instructions that: cause the one or more processors of the mobile computing device to determine, based on the motion data, that the user of both the mobile computing device and the wearable computing device is likely viewing the wearable computing device; or cause the one or more processors of the wearable computing device to determine, based on the motion data, that the user of the wearable computing device is likely viewing the wearable computing device, and wherein the instructions that cause the one or more processors of the computing device to output, for display at the wearable computing device, the indication of the private information comprise instructions that: cause the one or more processors of the mobile computing device to output, for display at the wearable computing device, the indication of the private information; or cause the one or more processors of the wearable computing device to output, for display at the wearable computing device, the indication of the private information.

Example 24

The computer-readable storage medium of any combination of examples 22-23, wherein the wearable computing device is a first wearable computing device, and wherein the computer-readable storage medium further stores instructions that, when executed by the one or more processors of the computing device, cause the one or more processors to: receive, from a second wearable computing device, motion data corresponding to a movement of the second wearable computing device, wherein the determination that the user is likely viewing the first wearable computing device is further based on the motion data received from the second wearable computing device.

Example 25

The computer-readable storage medium of any combination of examples 22-24, wherein the first wearable computing device is worn on a wrist of the user, and wherein the second wearable computing device is worn on a head of the user.

Example 26

The computer-readable storage medium of any combination of examples 22-25, wherein the movement of the first wearable computing device occurs at a first time, wherein the movement of the second wearable computing device occurs at a second time, and wherein the determination that the user of the mobile computing device is likely viewing the first wearable computing device comprises determining that a difference between the first time and the second time is less than a threshold.

Example 27

The computer-readable storage medium of any combination of examples 22-26, wherein the computing device is a mobile computing device, wherein the instructions that cause the one or more processors of the computing device to receive the first indication of the incoming communication comprise instructions that: cause the one or more processors of the mobile computing device to receive the first indication of the incoming communication, wherein the instructions that cause the one or more processors of the computing device to output, for display at the wearable computing device, the second indication of the incoming communication comprise instructions that: cause the one or more processors of the mobile computing device to output, for display at the wearable computing device, the second indication of the incoming communication, wherein the instructions that cause the one or more processors of the computing device to determine, based on the motion data generated by the wearable computing device, that the user of the wearable computing device is likely viewing the wearable computing device comprise instructions that: cause the one or more processors of the mobile computing device to determine, based on the motion data, that the user of both the mobile computing device and the wearable computing device is likely viewing the wearable computing device, and wherein the instructions that cause the one or more processors of the computing device to output, for display at the wearable computing device, the indication of the private information comprise instructions that: cause the one or more processors of the mobile computing device to output, for display at the wearable computing device, the indication of the private information.

Example 28

The computer-readable storage medium of any combination of examples 22-27, wherein the computing device is the wearable computing device, wherein the instructions that cause the one or more processors of the computing device to receive the first indication of the incoming communication comprise instructions that: cause the one or more processors of the wearable computing device to receive the first indication of the incoming communication, wherein the instructions that cause the one or more processors of the computing device to output, for display at the wearable computing device, the second indication of the incoming communication comprise instructions that: cause the one or more processors of the wearable computing device to output, for display at the wearable computing device, the second indication of the incoming communication, wherein the instructions that cause the one or more processors of the computing device to determine, based on the motion data generated by the wearable computing device, that the user of the wearable computing device is likely viewing the wearable computing device comprise instructions that: cause the one or more processors of the wearable computing device to determine, based on the motion data, that the user of the wearable computing device is likely viewing the wearable computing device, and wherein the instructions that cause the one or more processors of the computing device to output, for display at the wearable computing device, the indication of the private information comprise instructions that: cause the one or more processors of the wearable computing device to output, for display at the wearable computing device, the indication of the private information.

Example 29

A wearable computing device comprising: one or more processors; one or more sensors; a display; and at least one module executable by the one or more processors to: receive a first indication of an incoming communication; determine that the incoming communication includes private information; output, for display at the display, a second indication of the incoming communication, wherein the second indication includes non-private information; generate, by at least one of the one or more sensors, motion data corresponding to a movement of the wearable computing device; determine, based on the motion data, that a user of the wearable computing device is likely viewing the wearable computing device; and output, for display at the display, an indication of the private information.

Example 30

The wearable computing device of example 29, wherein the wearable computing device is worn on a wrist of the user, wherein the movement of the wearable computing device corresponds to a movement of the user, and wherein the movement of the user comprises an internal rotation of the wrist.

Example 31

The wearable computing device of any combination of examples 29-30, wherein the movement of the user further comprises a flexion of a shoulder of the user and a flexion of an elbow of the user.

Example 32

The wearable computing device of any combination of examples 29-31, wherein the at least one module is further executable by the one or more processors to determine, based on one or more of: a sender of the incoming communication, content of the incoming communication, a privacy flag included in the incoming communication, and one or more predefined privacy settings, that the incoming communication includes private information.

Example 33

The wearable computing device of any combination of examples 29-32, wherein the incoming communication includes an image, and wherein the at least one module is further executable by the one or more processors to determine that the incoming communication includes private information by at least: identifying an object included in the image; and determining, based on the object included in the image, that the incoming communication includes private information.

Example 34

The wearable computing device of any combination of examples 29-33, wherein the at least one module is further executable by the one or more processors to: receive, from another wearable computing device, motion data corresponding to a movement of the other wearable computing device, wherein the determination that the user is likely viewing the wearable computing device is further based on the motion data received from the other wearable computing device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the invention have been described. These and other examples are within the scope of the following claims.

The invention claimed is:
1. A method comprising:
receiving a first indication of an incoming communication;
determining that the incoming communication includes private information;
outputting, for display at a first wearable computing device, a second indication of the incoming communication, wherein the second indication includes non-private information;
receiving first motion data generated by the first wearable computing device that corresponds to a movement of the first wearable device at a first time;
receiving second motion data generated by a second wearable device that corresponds to a movement of the second wearable device at a second time;

responsive to determining that a difference between the first time and the second time is less than a threshold amount of time, determining, based on the first motion data and the second motion data, that a user of the first wearable computing device is likely viewing the first wearable computing device; and responsive to determining that the user is likely viewing the first wearable device, outputting, for display at the first wearable computing device, an indication of the private information.

2. The method of claim 1, wherein receiving the first indication of the incoming communication comprises: receiving, by a mobile computing device and from a server device, the first indication of the incoming communication, wherein determining that the incoming communication includes the private information comprises: determining, by the mobile computing device, that the incoming communication includes the private information, wherein outputting, for display at the first wearable computing device, the second indication of the incoming communication comprises: outputting, by the mobile computing device and for display at the first wearable computing device, the second indication of the incoming communication, wherein receiving the first motion data comprises: receiving, by the mobile computing device and from the first wearable computing device, the first motion data, wherein receiving the second motion data comprises: receiving, by the mobile computing device and from the second wearable computing device, the second motion data, wherein responsive to determining that the difference between the first time and the second time is less than the threshold amount of time, determining, based on the first motion data and the second motion data, that the user of the first wearable computing device is likely viewing the first wearable computing device comprises:
responsive to determining, by the mobile computing device, that the difference between the first time and the second time is less than the threshold amount of time, determining, by the mobile computing device and based on the first motion data and the second motion data, that the user of both the mobile computing device and the first wearable computing device is likely viewing the first wearable computing device, and wherein responsive to determining that the user is likely viewing the first wearable device, outputting, for display at the first wearable computing device, the indication of the private information comprises:
responsive to determining, by the mobile computing device, that the user is likely viewing the first wearable device, outputting, by the mobile computing device and for display at the first wearable computing device, the indication of the private information.

3. The method of claim 1, wherein receiving the first indication of the incoming communication comprises: receiving, by the first wearable computing device and from the server device, the first indication of the incoming communication, wherein determining that the incoming communication includes the private information comprises: determining, by the first wearable computing device, that the incoming communication includes the private information, wherein outputting, for display at the first wearable computing device, the second indication of the incoming communication comprises: outputting, by the first wearable computing device and for display at the wearable computing device, the second indication of the incoming communication, wherein receiving the first motion data comprises: receiving, by the first wearable computing device and from one or more motion sensors of the first wearable computing device, the first motion data, wherein receiving the second motion data comprises: receiving, by the first wearable computing device and from the second wearable computing device, the second motion data, wherein responsive to determining that the difference between the first time and the second time is less than the threshold amount of time, determining, based on the first motion data and the second motion data, that the user of the first wearable computing device is likely viewing the first wearable computing device comprises:
responsive to determining, by the first wearable computing device, that the difference between the first time and the second time is less than the threshold amount of time, determining, by the first wearable computing device and based on the first motion data and the second motion data, that the user of the wearable computing device is likely viewing the wearable computing device, and wherein responsive to determining that the user is likely viewing the first wearable device, outputting, for display at the first wearable computing device, the indication of the private information comprises:
responsive to determining, by the first wearable computing device, that the user is likely viewing the first wearable device, outputting, by the first wearable computing device and for display at the first wearable computing device, the indication of the private information.

4. The method of claim 1, wherein the first wearable computing device is worn on a wrist of the user, and wherein the second wearable computing device is worn on a head of the user.

5. The method of claim 1, wherein the movement of the second wearable computing device corresponds to a movement of the user, and wherein the movement of the user comprises a flexion of a cervical spine of the user and a rotation of a head of the user.

6. The method of claim 1, wherein the first wearable computing device is worn on a wrist of the user, wherein the movement of the first wearable computing device corresponds to a movement of the user, and wherein the movement of the user comprises an internal rotation of the wrist.

7. The method of claim 6, wherein the movement of the user further comprises a flexion of a shoulder of the user, and a flexion of an elbow of the user.

8. The method of claim 1, wherein determining that the incoming communication includes private information comprises determining, based on one or more of:
a sender of the incoming communication,
content of the incoming communication,
a privacy flag included in the incoming communication, and
one or more predefined privacy settings, that the incoming communication includes private information.

9. The method of claim 1, wherein the incoming communication includes an image, and wherein determining that the incoming communication includes private information comprises:
identifying an object included in the image; and
determining, based on the object included in the image, that the incoming communication includes private information.

10. The method of claim 9, wherein identifying the object included in the image further comprises:
determining a portion of image data from the image;

determining an image signature that represents the portion of selected image data;

determining a confidence value that indicates a likelihood that the image signature matches an object signature associated with private information; and responsive to determining that the confidence value is greater than a predetermined value, determining that the incoming communication includes private information.

11. The method of claim 1, wherein the second indication of the incoming communication is a graphical indication of the incoming communication.

12. The method of claim 1, wherein the non-private information includes the identity of a sender of the incoming communication, and wherein the private information includes at least a portion of content of the incoming communication.

13. A mobile computing device comprising: one or more processors;

and at least one module executable by the one or more processors to:

receive a first indication of an incoming communication; determine that the incoming communication includes private information; output, for display at a first wearable computing device, a second indication of the incoming communication, wherein the second indication includes non-private information;

receive, from the first wearable computing device, first motion data that corresponds to a movement of the first wearable computing device at a first time;

receive, from a second wearable computing device, second motion data that corresponds to a movement of the second wearable computing device at a second time;

responsive to determining that a difference between the first time and the second time is less than a threshold amount of time, determine, based on the first motion data and the second motion data, that a user of the mobile computing device is likely viewing the first wearable computing device; and responsive to determining that the user is likely viewing the first wearable device, output, for display at the first wearable computing device, an indication of the private information.

14. The mobile computing device of claim 13, wherein the first wearable computing device is worn on a wrist of the user, wherein the movement of the first wearable computing device corresponds to a movement of the user, and wherein the movement of the user comprises an internal rotation of the wrist.

15. The mobile computing device of claim 13, wherein the at least one module is further executable by the one or more processors to determine, based on one or more of:

a sender of the incoming communication,
content of the incoming communication,
a privacy flag included in the incoming communication, and
one or more predefined privacy settings, that the incoming communication includes private information.

16. The mobile computing device of claim 13, wherein the incoming communication includes an image, wherein the at least one module is further executable by the one or more processors to determine that the incoming communication includes private information by at least:

identifying an object included in the image; and
determining, based on the object included in the image, that the incoming communication includes private information.

17. The mobile computing device of claim 16, wherein the at least one module is executable by the one or more processors to identify the object included in the image by at least:

determining a portion of image data from the image;
determining an image signature that represents the portion of selected image data;
determining a confidence value that indicates a likelihood that the image signature matches an object signature associated with private information; and
responsive to determining that the confidence value is greater than a predetermined value, determining that the incoming communication includes private information.

18. The mobile computing device of claim 13, wherein the second indication of the incoming communication is a graphical indication of the incoming communication.

19. The mobile computing device of claim 13, wherein the non-private information includes the identity of a sender of the incoming communication, and wherein the private information includes at least a portion of content of the incoming communication.

20. A non-transitory computer-readable storage medium that stores instructions that, when executed by one or more processors of a computing device, cause the one or more processors to:

receive a first indication of an incoming communication;
determine that the incoming communication includes private information;
output, for display at a first wearable computing device, a second indication of the incoming communication, wherein the second indication includes non-private information;
receive first motion data generated by the first wearable computing device that corresponds to a movement of the first wearable device at a first time;
receive second motion data generated by a second wearable device that corresponds to a movement of the second wearable device at a second time;
responsive to determining that a difference between the first time and the second time is less than a threshold amount of time, determine, based on the first motion data and the second motion data, that a user of the first wearable computing device is likely viewing first the wearable computing device; and
responsive to determining that the user is likely viewing the first wearable device, output, for display at the wearable computing device, an indication of the private information.

21. The non-transitory computer-readable storage medium of claim 20, wherein the computing device is a mobile computing device,
wherein the instructions that cause the one or more processors of the computing device to receive the first indication of the incoming communication comprise instructions that:
cause the one or more processors of the mobile computing device to receive the first indication of the incoming communication,
wherein the instructions that cause the one or more processors of the computing device to output, for display at the first wearable computing device, the second indication of the incoming communication comprise instructions that:
cause the one or more processors of the mobile computing device to output, for display at the first wearable computing device, the second indication of the incoming communication, wherein the instructions that cause the one or more processors of the computing device to receive the first motion data comprise instructions that: cause the one or more processors of the mobile computing device to receive, from the first wearable computing device, the first motion data, wherein the instructions that cause the one or more processors of the computing device to receive the second motion data comprise instructions that: cause the one or more processors of the mobile computing device to receive, from the second wearable computing device, the second motion data, wherein the instructions that cause the one or more processors of the computing device to, responsive to determining that the difference between the first time and the second time is less than the threshold amount of time, determine, based on the first motion data and the second motion data, that the user of the first wearable computing device is likely viewing the first wearable computing device comprise instructions that:

cause the one or more processors of the mobile computing device to, responsive to determining that the difference between the first time and the second time is less than the threshold amount of time, determine, based on the first motion data and the second motion data, that the user of both the mobile computing device and the wearable computing device is likely viewing the first wearable computing device, and wherein the instructions that cause the one or more processors of the computing device to, responsive to determining that the user is likely viewing the first wearable device, output, for display at the first wearable computing device, the indication of the private information comprise instructions that:

cause the one or more processors of the mobile computing device to, responsive to determining that the user is likely viewing the first wearable device, output, for display at the first wearable computing device, the indication of the private information.

22. The non-transitory computer-readable storage medium of claim 20, wherein the computing device is the first wearable computing device, wherein the instructions that cause the one or more processors of the computing device to receive the first indication of the incoming communication comprise instructions that:

cause the one or more processors of the first wearable computing device to receive the first indication of the incoming communication, wherein the instructions that cause the one or more processors of the computing device to output, for display at the first wearable computing device, the second indication of the incoming communication comprise instructions that:

cause the one or more processors of the first wearable computing device to output, for display at the first wearable computing device, the second indication of the incoming communication, wherein the instructions that cause the one or more processors of the computing device to receive the first motion data comprise instructions that:

cause the one or more processors of the first wearable computing device to receive, from one or more motion sensors of the first wearable computing device, the first motion data, wherein the instructions that cause the one or more processors of the computing device to receive the second motion data comprise instructions that: cause the one or more processors of the first wearable computing device to receive, from the second wearable computing device, the second motion data, wherein the instructions that cause the one or more processors of the computing device to responsive to determining that the difference between the first time and the second time is less than the threshold amount of time, determine, based on the first motion data and the second motion data, that the user of the first wearable computing device is likely viewing the first wearable computing device comprise instructions that:

cause the one or more processors of the first wearable computing device to, responsive to determining that the difference between the first time and the second time is less than the threshold amount of time, determine, based on the first motion data and the second motion data, that the user of the first wearable computing device is likely viewing the wearable computing device, and wherein the instructions that cause the one or more processors of the computing device to, responsive to determining that the user is likely viewing the first wearable device, output, for display at the first wearable computing device, the indication of the private information comprise instructions that:

cause the one or more processors of the first wearable computing device to, responsive to determining that the user is likely viewing the first wearable device, output, for display at the first wearable computing device, the indication of the private information.

23. The non-transitory computer-readable storage medium of claim 20, wherein the first wearable computing device is worn on a wrist of the user, and wherein the second wearable computing device is worn on a head of the user.

24. A wearable computing device comprising: one or more processors; one or more sensors; a display; and at least one module executable by the one or more processors to:

receive a first indication of an incoming communication; determine that the incoming communication includes private information; output, for display at the display, a second indication of the incoming communication, wherein the second indication includes non-private information;

generate, by at least one of the one or more sensors, first motion data that corresponds to a movement of the wearable computing device at a first time;

receive, from another wearable computing device, second motion data that corresponds to a movement of the other wearable computing device at a second time; responsive to determining that a difference between the first time and the second time is less than a threshold amount of time, determine, based on the first motion data and the second motion data, that a user of the wearable computing device is likely viewing the wearable computing device; and responsive to determining that the user is likely viewing the first wearable device, output, for display at the display, an indication of the private information.

25. The wearable computing device of claim 24, wherein the wearable computing device is worn on a wrist of the user, wherein the movement of the wearable computing device corresponds to a movement of the user, and wherein the movement of the user comprises an internal rotation of the wrist.

26. The wearable computing device of claim 24, wherein the at least one module is further executable by the one or more processors to determine, based on one or more of:

a sender of the incoming communication,
content of the incoming communication,
a privacy flag included in the incoming communication, and
one or more predefined privacy settings, that the incoming communication includes private information.

27. The wearable computing device of claim 24, wherein the incoming communication includes an image, and wherein the at least one module is further executable by the one or more processors to determine that the incoming communication includes private information by at least:

identifying an object included in the image; and
determining, based on the object included in the image, that the incoming communication includes private information.

28. The wearable computing device of claim 27, wherein the at least one module is executable by the one or more processors to identify the object included in the image by at least:

determining a portion of image data from the image;
determining an image signature that represents the portion of selected image data;
determining a confidence value that indicates a likelihood that the image signature matches an object signature associated with private information; and
responsive to determining that the confidence value is greater than a predetermined value, determining that the incoming communication includes private information.

29. The wearable computing device of claim 24, wherein the second indication of the incoming communication is a graphical indication of the incoming communication.

30. The wearable computing device of claim 24, wherein the non-private information includes the identity of a sender of the incoming communication, and wherein the private information includes at least a portion of content of the incoming communication.

\* \* \* \* \*